United States Patent
Jang

(10) Patent No.: US 11,899,973 B2
(45) Date of Patent: Feb. 13, 2024

(54) CONTROLLER AND METHOD OF OPERATING THE SAME

(71) Applicant: SK hynix Inc., Gyeonggi-do (KR)

(72) Inventor: Min Jun Jang, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 168 days.

(21) Appl. No.: 17/506,326

(22) Filed: Oct. 20, 2021

(65) Prior Publication Data

US 2022/0342602 A1 Oct. 27, 2022

(30) Foreign Application Priority Data

Apr. 22, 2021 (KR) .................. 10-2021-0052605

(51) Int. Cl.
*G06F 3/06* (2006.01)

(52) U.S. Cl.
CPC ............ *G06F 3/0659* (2013.01); *G06F 3/064* (2013.01); *G06F 3/0604* (2013.01); *G06F 3/0679* (2013.01)

(58) Field of Classification Search
CPC ...... G06F 3/0659; G06F 3/0604; G06F 3/064; G06F 3/0679; G06F 3/061; G06F 3/0616; G06F 3/0607; G06F 3/0658; G06F 3/0653

See application file for complete search history.

(56) References Cited

U.S. PATENT DOCUMENTS

| 2015/0170747 A1* | 6/2015 | Liu ...................... G11C 16/107 365/185.03 |
| 2015/0332770 A1* | 11/2015 | Kim ...................... G11C 16/20 365/185.12 |
| 2021/0223994 A1* | 7/2021 | Kanno .................. G06F 3/0679 |
| 2022/0171570 A1* | 6/2022 | Kim ...................... G06F 3/0659 |

FOREIGN PATENT DOCUMENTS

| KR | 101854200 B1 | 6/2018 |
| KR | 1020190075563 A | 7/2019 |

* cited by examiner

*Primary Examiner* — Francisco A Grullon
(74) *Attorney, Agent, or Firm* — IP & T GROUP LLP

(57) ABSTRACT

A controller controls a semiconductor memory device including a plurality of memory blocks. The controller includes a block manager, a map data manager, and a command generator. The block manager manages information on the plurality of memory blocks. The map data manager manages map data for data stored in the plurality of memory blocks. The command generator generates a program command for controlling a program operation of the semiconductor memory device. The command generator generates a program command for storing data in a first memory block among the plurality of memory blocks, and determines a second memory block to store dummy data based on information from the block manager when the first memory block is full by a program operation corresponding to the program command.

18 Claims, 18 Drawing Sheets

CONTROLLER AND METHOD OF OPERATING THE SAME

CROSS-REFERENCE TO RELATED APPLICATION

The present application claims priority under 35 U.S.C. § 119(a) to Korean patent application number 10-2021-0052605 filed on Apr. 22, 2021, the entire disclosure of which is incorporated by reference herein.

BACKGROUND

Field of Invention

The present disclosure relates to an electronic device, and more particularly, to a controller and a method of operating the same.

Description of Related Art

A semiconductor memory device may be formed in a two-dimensional structure in which strings are horizontally arranged on a semiconductor substrate, or in a three-dimensional structure in which the strings are vertically stacked on the semiconductor substrate. A three-dimensional semiconductor memory device is a semiconductor memory device designed to resolve a limit of an integration degree of a two-dimensional memory device, and may include a plurality of memory cells that are vertically stacked on a semiconductor substrate.

SUMMARY

An embodiment of the present disclosure provides a controller capable of minimizing the number of map updates and a method of operating the same.

According to an embodiment of the present disclosure, a controller controls a semiconductor memory device including a plurality of memory blocks. The controller includes a block manager, a map data manager, and a command generator. The block manager manages information on the plurality of memory blocks. The map data manager manages map data for data stored in the plurality of memory blocks. The command generator generates a program command for controlling a program operation of the semiconductor memory device. The command generator generates the program command for the program operation of storing data in a first memory block among the plurality of memory blocks. The command generator is further configured to determine a second memory block to store dummy data based on the information from the block manager when the first memory block is full by the program operation.

In an embodiment of the present disclosure, the command generator may generate the program command for controlling the semiconductor memory device to store the dummy data in the second memory block.

In an embodiment of the present disclosure, as the dummy data is stored in the second memory block, the second memory block may become a full state.

In an embodiment of the present disclosure, the map data manager may be further configured to update the map data corresponding to the first and second memory blocks, and transmit the updated map data to the command generator.

In an embodiment of the present disclosure, the command generator may generate the program command for controlling the semiconductor memory device to store the updated map data corresponding to the first and second memory blocks.

In an embodiment of the present disclosure, the command generator may determine, as the second memory block, an open block in which an available space is smaller than a predetermined reference value among the plurality of memory blocks, based on the information from the block manager.

In an embodiment of the present disclosure, the command generator may determine, as the second memory block, an open block in which an available space is the smallest among the plurality of memory blocks, based on the information from the block manager.

In an embodiment of the present disclosure, the plurality of memory blocks may include a single-level cell (SLC) block, and at least one of a multi-level cell (MLC) block or a triple-level cell (TLC) block. The first memory block may be the at least one of the MLC block or the TLC block. The command generator may determine the SLC block as the second memory block.

In an embodiment of the present disclosure, the plurality of memory blocks may include a single-level cell (SLC) block, and at least one of a multi-level cell (MLC) block or a triple-level cell (TLC) block. The first memory block may be the SLC block. The command generator may determine the at least one of the MLC block or the TLC block as the second memory block.

According to an embodiment of the present disclosure, a method of operating a controller that controls a semiconductor memory device including a plurality of memory blocks includes controlling the semiconductor memory device to store data in a first memory block among the plurality of memory blocks, and determining a second memory block from among the plurality of memory blocks, in which dummy data is to be stored, in response to a determination that the first memory block is full.

In an embodiment of the present disclosure, the method may further include controlling the semiconductor memory device to store the dummy data in the second memory block.

In an embodiment of the present disclosure, as the dummy data is stored in the second memory block, the second memory block may become a full state.

In an embodiment of the present disclosure, the method may further include updating map data corresponding to the first and second memory blocks, and controlling the semiconductor memory device to store the updated map data.

In an embodiment of the present disclosure, the determining the second memory block may include referring to an available space of each memory block corresponding to an open block among the plurality of memory blocks, and determining as the second memory block a memory block in which the available space is smaller than a predetermined reference value among the open blocks.

In an embodiment of the present disclosure, the determining the second memory block may include referring to an available space of each memory block corresponding to an open block among the plurality of memory blocks, and determining as the second memory block a memory block in which the available space is the smallest among the open blocks.

In an embodiment of the present disclosure, the plurality of memory blocks may include a single-level cell (SLC) block, and at least one of a multi-level cell (MLC) block or a triple-level cell (TLC) block. The first memory block may be the at least one of the MLC block or the TLC block. The determining the second memory block may include determining the SLC block as the second memory block.

In an embodiment of the present disclosure, the plurality of memory blocks may include a single-level cell (SLC) block, and at least one of a multi-level cell (MLC) block or a triple-level cell (TLC) block. The first memory block may be the SLC block. The determining the second memory block may include determining the at least one of the MLC block or the TLC block as the second memory block.

According to an embodiment of the present disclosure, an operating method of a controller for controlling a memory device including a plurality of memory units includes controlling, when a first memory unit among the plurality of memory units becomes closed, the memory device to make a second memory unit among the plurality of memory units closed, updating map data corresponding to the closed first and second memory units, and controlling the memory device to store therein the updated map data.

In an embodiment of the present disclosure, the second memory unit may have an available storage space smaller than a threshold.

In an embodiment of the present disclosure, the second memory unit may have an available storage space smallest among open memory units included in the memory device.

The present technology may provide a controller capable of minimizing the number of map updates and a method of operating the same.

DETAILED DESCRIPTION

Specific structural or functional descriptions of embodiments according to the concepts which are disclosed in the present specification are illustrated only to describe the embodiments according to the concept of the present disclosure. The embodiments according to the concept of the present disclosure may be carried out in various forms and should not be construed as being limited to the embodiments described in the present specification.

Figure 1:
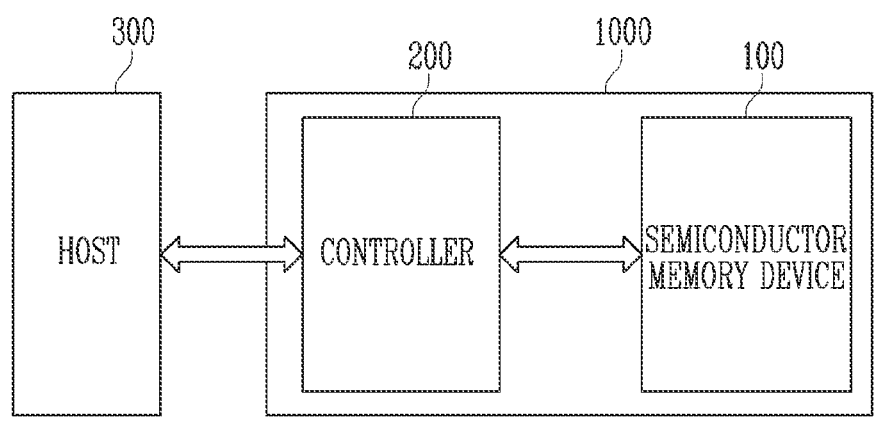
FIG. 1 is a block diagram illustrating a memory system including a controller according to an embodiment of the present disclosure.

FIG. 1 is a block diagram illustrating a memory system 1000 including a controller according to an embodiment of the present disclosure.

Referring to FIG. 1, the memory system 1000 includes a semiconductor memory device 100 and a controller 200. In addition, the memory system 1000 communicates with a host 300. The controller 200 controls an overall operation of the semiconductor memory device 100. In addition, the controller 200 controls an operation of the semiconductor memory device 100 based on a command received from the host 300.

Figure 2:
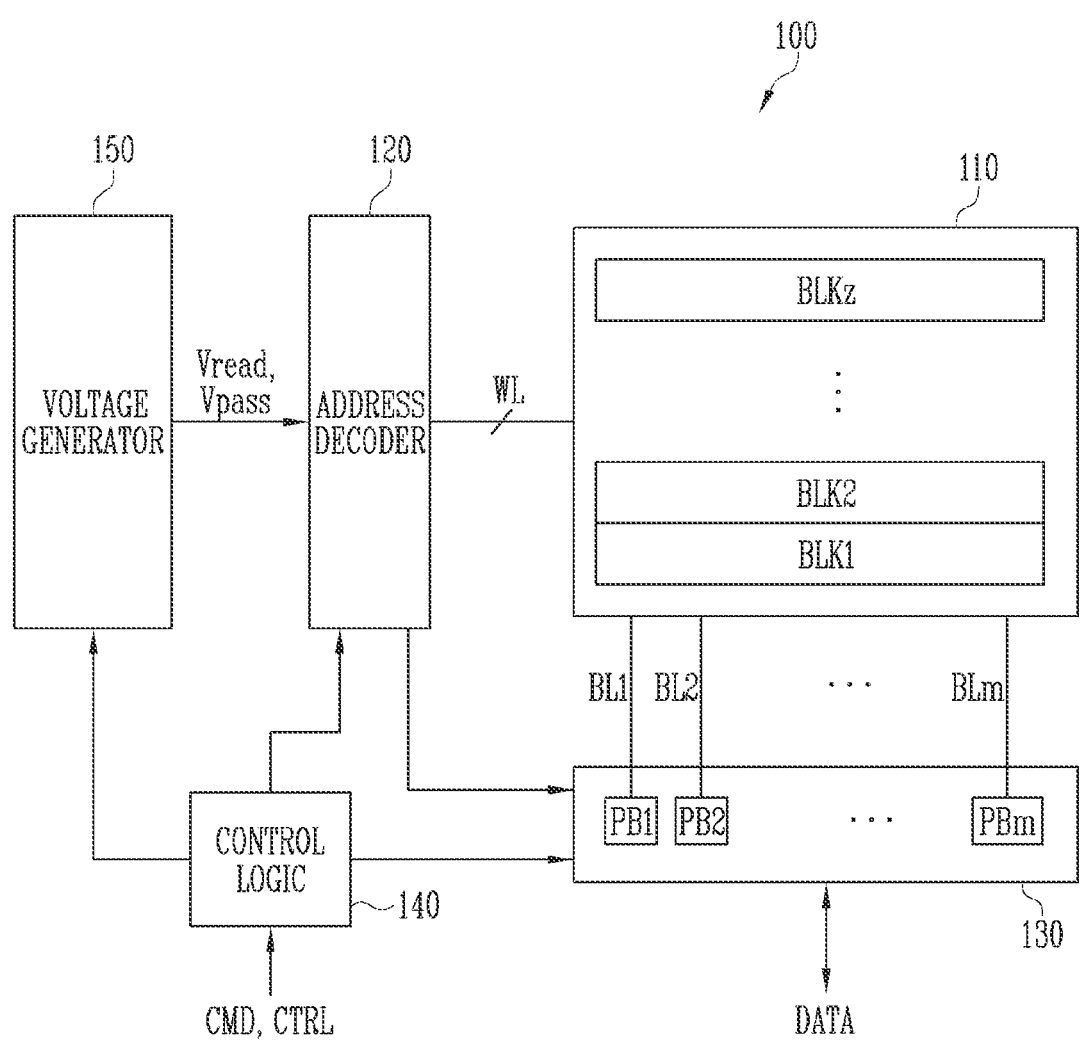
FIG. 2 is a block diagram illustrating a semiconductor memory device of FIG. 1 according to an embodiment of the present disclosure.

FIG. 2 is a block diagram illustrating the semiconductor memory device 100 of FIG. 1 according to an embodiment of the present disclosure.

Referring to FIG. 2, the semiconductor memory device 100 includes a memory cell array 110, an address decoder 120, a read and write circuit 130, a control logic 140, and a voltage generator 150.

The memory cell array 110 includes a plurality of memory blocks BLK1 to BLKz. The plurality of memory blocks BLK1 to BLKz are connected to the address decoder 120 through word lines WL. The plurality of memory blocks BLK1 to BLKz are connected to the read and write circuit 130 through bit lines BL1 to BLm. Each of the plurality of memory blocks BLK1 to BLKz includes a plurality of memory cells. In an embodiment, the plurality of memory cells are non-volatile memory cells, and may be configured of non-volatile memory cells having a vertical channel structure. The memory cell array 110 may be configured as a memory cell array of a two-dimensional structure. According to an embodiment, the memory cell array 110 may be configured as a memory cell array of a three-dimensional structure. Each of the plurality of memory cells included in the memory cell array may store at least one bit of data. In an embodiment, each of the plurality of memory cells included in the memory cell array 110 may be a single-level cell (SLC) storing one bit of data. In another embodiment, each of the plurality of memory cells included in the memory cell array 110 may be a multi-level cell (MLC) storing two bits of data. In still another embodiment, each of the plurality of memory cells included in the memory cell array 110 may be a triple-level cell storing three bits of data. In still another embodiment, each of the plurality of memory cells included in the memory cell array 110 may be a quad-level cell storing four bits of data. According to an embodiment, the memory cell array 110 may include a plurality of memory cells each storing five or more bits of data.

The address decoder 120, the read and write circuit 130, the control logic 140, and the voltage generator 150 operate as a peripheral circuit that drives the memory cell array 110. The address decoder 120 is connected to the memory cell array 110 through the word lines WL. The address decoder 120 is configured to operate in response to control of the control logic 140. The address decoder 120 receives an address through an input/output buffer (not shown) inside the semiconductor memory device 100.

The address decoder 120 is configured to decode a block address among received addresses. The address decoder 120 selects at least one memory block according to the decoded block address. In addition, the address decoder 120 applies a read voltage Vread generated in the voltage generator 150 to a selected word line of the selected memory block at a time of a read voltage application operation during a read operation, and applies a pass voltage Vpass to the remaining unselected word lines. In addition, during a program verify operation, the address decoder 120 applies a verify voltage generated in the voltage generator 150 to the selected word line of the selected memory block, and applies the pass voltage Vpass to the remaining unselected word lines.

The address decoder 120 is configured to decode a column address of the received addresses. The address decoder 120 transmits the decoded column address to the read and write circuit 130.

A read operation and a program operation of the semiconductor memory device 100 are performed in a page unit. Addresses received at a time of a request of the read operation and the program operation include a block address, a row address, and a column address. The address decoder 120 selects one memory block and one word line according to the block address and the row address. The column address is decoded by the address decoder 120 and is provided to the read and write circuit 130.

The address decoder 120 may include a block decoder, a row decoder, a column decoder, an address buffer, and the like.

The read and write circuit 130 includes a plurality of page buffers PB1 to PBm. The read and write circuit 130 may operate as a "read circuit" during a read operation of the memory cell array 110 and may operate as a "write circuit" during a write operation of the memory cell array 110. The plurality of page buffers PB1 to PBm are connected to the memory cell array 110 through the bit lines BL1 to BLm. During the read operation and the program verify operation, in order to sense a threshold voltage of the memory cells, the plurality of page buffers PB1 to PBm sense a change of an amount of a current flowing according to a program state of a corresponding memory cell through a sensing node while continuously supplying a sensing current to the bit lines connected to the memory cells, and latches the sensed change as sensing data. The read and write circuit 130 operates in response to page buffer control signals output from the control logic 140.

During the read operation, the read and write circuit 130 senses data of the memory cell, temporarily stores read data, and outputs data DATA to the input/output buffer (not shown) of the semiconductor memory device 100. In an embodiment, the read and write circuit 130 may include a column selection circuit, and the like, in addition to the page buffers (or page registers).

The control logic 140 is connected to the address decoder 120, the read and write circuit 130, and the voltage generator 150. The control logic 140 receives a command CMD and a control signal CTRL through the input/output buffer (not shown) of the semiconductor memory device 100. The control logic 140 is configured to control overall operations of the semiconductor memory device 100 in response to the control signal CTRL. In addition, the control logic 140 outputs a control signal for adjusting a sensing node precharge potential level of the plurality of page buffers PB1 to PBm. The control logic 140 may control the read and write circuit 130 to perform the read operation of the memory cell array 110.

The voltage generator 150 generates the read voltage Vread and the pass voltage Vpass during the read operation in response to the control signal output from the control logic 140. In order to generate a plurality of voltages having various voltage levels, the voltage generator 150 may include a plurality of pumping capacitors that receive an internal power voltage, and generate the plurality of voltages by selectively activating the plurality of pumping capacitors in response to the control of the control logic 140. As described above, the voltage generator 150 may include a charge pump, and the charge pump may include a plurality of pumping capacitors described above. A specific configuration of the charge pump included in the voltage generator 150 may be variously designed as necessary.

The address decoder 120, the read and write circuit 130, and the voltage generator 150 may function as a "peripheral circuit" that performs a read operation, a write operation, and an erase operation on the memory cell array 110. The peripheral circuit performs the read operation, the write operation, and the erase operation on the memory cell array 110 based on the control of the control logic 140.

Figure 3:
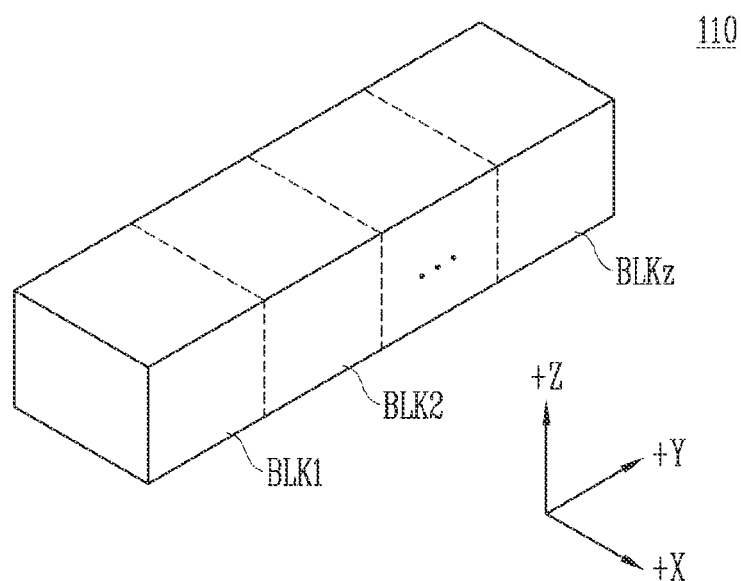
FIG. 3 is a diagram illustrating a memory cell array of FIG. 2 according to an embodiment of the present disclosure.

FIG. 3 is a diagram illustrating the memory cell array 110 of FIG. 2 according to an embodiment of the present disclosure.

Referring to FIG. 3, the memory cell array 110 includes a plurality of memory blocks BLK1 to BLKz. Each memory block may have a three-dimensional structure. Each memory block includes a plurality of memory cells stacked on a substrate. The plurality of memory cells are arranged along a +X direction, a +Y direction, and a +Z direction. A structure of each memory block is described in more detail with reference to FIGS. 4 and 5.

Figure 4:
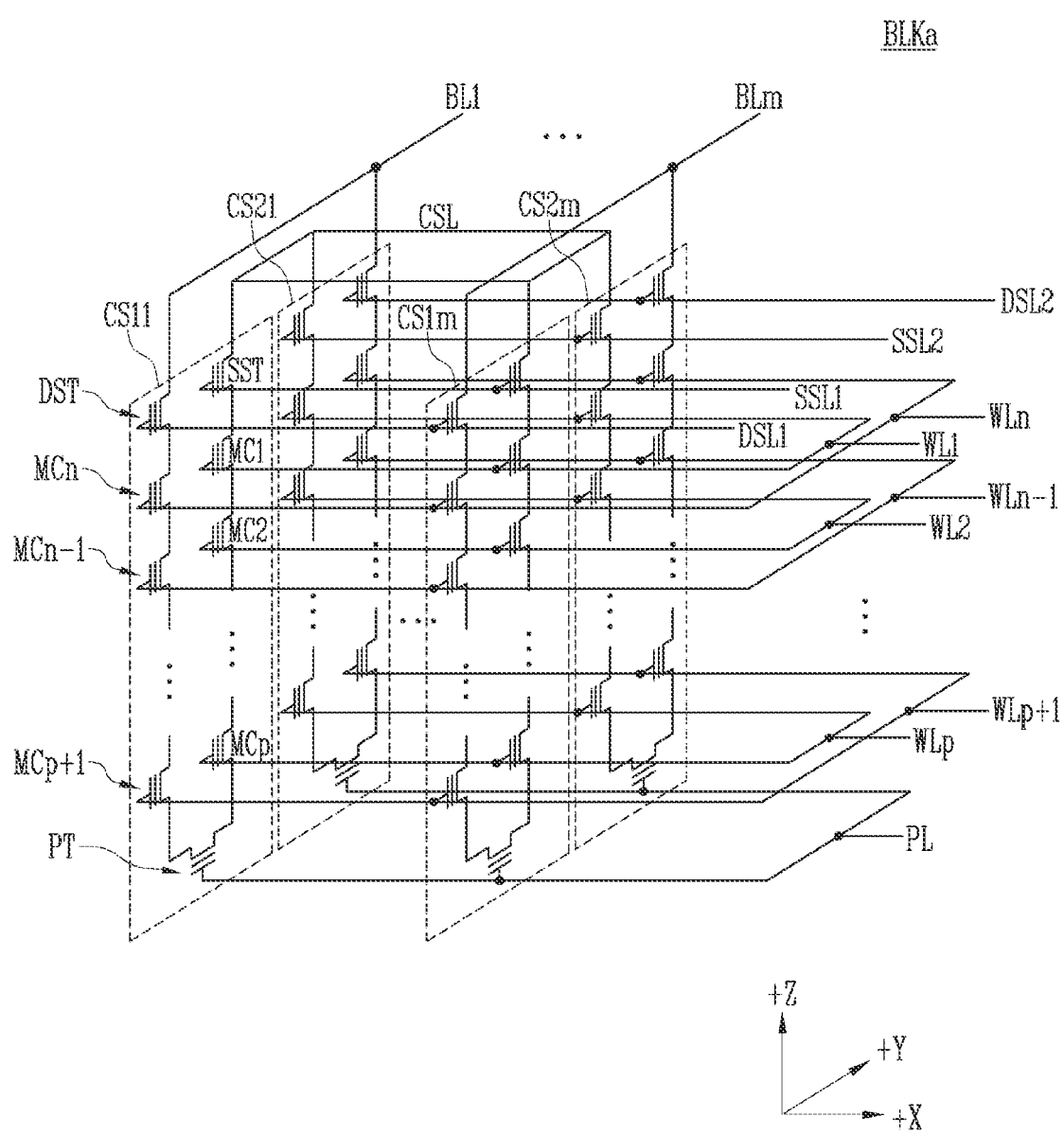
FIG. 4 is a circuit diagram illustrating a memory block BLKa of the memory blocks BLK1 to BLKz of FIG. 3 according to an embodiment of the present disclosure.

FIG. 4 is a circuit diagram illustrating a memory block BLKa of the memory blocks BLK1 to BLKz of FIG. 3 according to an embodiment of the present disclosure.

Referring to FIG. 4, the memory block BLKa includes a plurality of cell strings CS11 to CS1m and CS21 to CS2m. In an embodiment, each of the plurality of cell strings CS11 to CS1m and CS21 to CS2m may be formed in a 'U' shape. In the memory block BLKa, m cell strings are arranged in a row direction (that is, the +X direction). In FIG. 4, two cell strings are arranged in a column direction (that is, the +Y direction). However, this is for convenience of description and it may be understood that three or more cell strings may be arranged in the column direction.

Each of the plurality of cell strings CS11 to CS1m and CS21 to CS2m includes at least one source select transistor SST, first to n-th memory cells MC1 to MCn, a pipe transistor PT, and at least one drain select transistor DST.

Each of the select transistors SST and DST and the memory cells MC1 to MCn may have a similar structure. In an embodiment, each of the select transistors SST and DST and the memory cells MC1 to MCn may include a channel layer, a tunneling insulating film, a charge storage film, and a blocking insulating film. In an embodiment, a pillar for providing the channel layer may be provided in each cell string. In an embodiment, a pillar for providing at least one of the channel layer, the tunneling insulating film, the charge storage film, and the blocking insulating film may be provided in each cell string.

The source select transistor SST of each cell string is connected between a common source line CSL and the memory cells MC1 to MCp.

In an embodiment, the source select transistors of the cell strings arranged in the same row are connected to a source select line extending in the row direction, and the source select transistors of the cell strings arranged in different rows are connected to different source select lines. In FIG. 4, the source select transistors of the cell strings CS11 to CS1$m$ of a first row are connected to a first source select line SSL1. The source select transistors of the cell strings CS21 to CS2$m$ of a second row are connected to a second source select line SSL2.

In another embodiment, the source select transistors of the cell strings CS11 to CS1$m$ and CS21 to CS2$m$ may be commonly connected to one source select line.

The first to n-th memory cells MC1 to MCn of each cell string are connected between the source select transistor SST and the drain select transistor DST.

The first to n-th memory cells MC1 to MCn may be divided into first to p-th memory cells MC1 to MCp and (p+1)-th to n-th memory cells MCp+1 to MCn. The first to p-th memory cells MC1 to MCp are sequentially arranged in a direction opposite to the +Z direction, and are connected in series between the source select transistor SST and the pipe transistor PT. The (p+1)-th to n-th memory cells MCp+1 to MCn are sequentially arranged in the +Z direction, and are connected in series between the pipe transistor PT and the drain select transistor DST. The first to p-th memory cells MC1 to MCp and the (p+1)-th to n-th memory cells MCp+1 to MCn are connected to each other through the pipe transistor PT. Gates of the first to n-th memory cells MC1 to MCn of each cell string are connected to the first to n-th word lines WL1 to WLn, respectively.

A gate of the pipe transistor PT of each cell string is connected to a pipeline PL.

The drain select transistor DST of each cell string is connected between a corresponding bit line and the memory cells MCp+1 to MCn. The drain select transistor DSTs of cell strings arranged in the row direction are connected to the drain select line extending in the row direction. The drain select transistors of the cell strings CS11 to CS1$m$ of the first row are connected to a first drain select line DSL1. The drain select transistors of the cell strings CS21 to CS2$m$ of the second row are connected to a second drain select line DSL2.

The cell strings arranged in the column direction are connected to the bit lines extending in the column direction. In FIG. 4, the cell strings CS11 and CS21 of the first column are connected to the first bit line BL1. The cell strings CS1$m$ and CS2$m$ of the m-th column are connected to the m-th bit line BLm.

The memory cells connected to the same word line in the cell strings arranged in the row direction configure one page. For example, the memory cells connected to the first word line WL1, among the cell strings CS11 to CS1$m$ of the first row configure one page. The memory cells connected to the first word line WL1, among the cell strings CS21 to CS2$m$ of the second row configure another page. The cell strings arranged in one row direction may be selected by selecting any of the drain select lines DSL1 and DSL2. One page of the selected cell strings may be selected by selecting any of the word lines WL1 to WLn.

In another embodiment, even bit lines and odd bit lines may be provided instead of the first to m-th bit lines BL1 to BLm. In addition, even-numbered cell strings among the cell strings CS11 to CS1$m$ or CS21 to CS2$m$ arranged in the row direction may be connected to the even bit lines, and odd-numbered cell strings among the cell strings CS11 to CS1$m$ or CS21 to CS2$m$ arranged in the row direction may be connected to odd bit lines, respectively.

In an embodiment, at least one of the first to n-th memory cells MC1 to MCn may be used as a dummy memory cell. For example, at least one dummy memory cell is provided to reduce an electric field between the source select transistor SST and the memory cells MC1 to MCp. Alternatively, at least one dummy memory cell is provided to reduce an electric field between the drain select transistor DST and the memory cells MCp+1 to MCn. As more dummy memory cells are provided, reliability of an operation for the memory block BLKa is improved, however, the size of the memory block BLKa increases. As less dummy memory cells are provided, the size of the memory block BLKa may be reduced, however, the reliability of the operation for the memory block BLKa may be reduced.

In order to efficiently control at least one dummy memory cell, each of the dummy memory cells may have a required threshold voltage. Before or after an erase operation for the memory block BLKa, program operations for all or a part of the dummy memory cells may be performed. When the erase operation is performed after the program operation is performed, the dummy memory cells may have the required threshold voltage by controlling a voltage applied to dummy word lines connected to the respective dummy memory cells.

Figure 5:
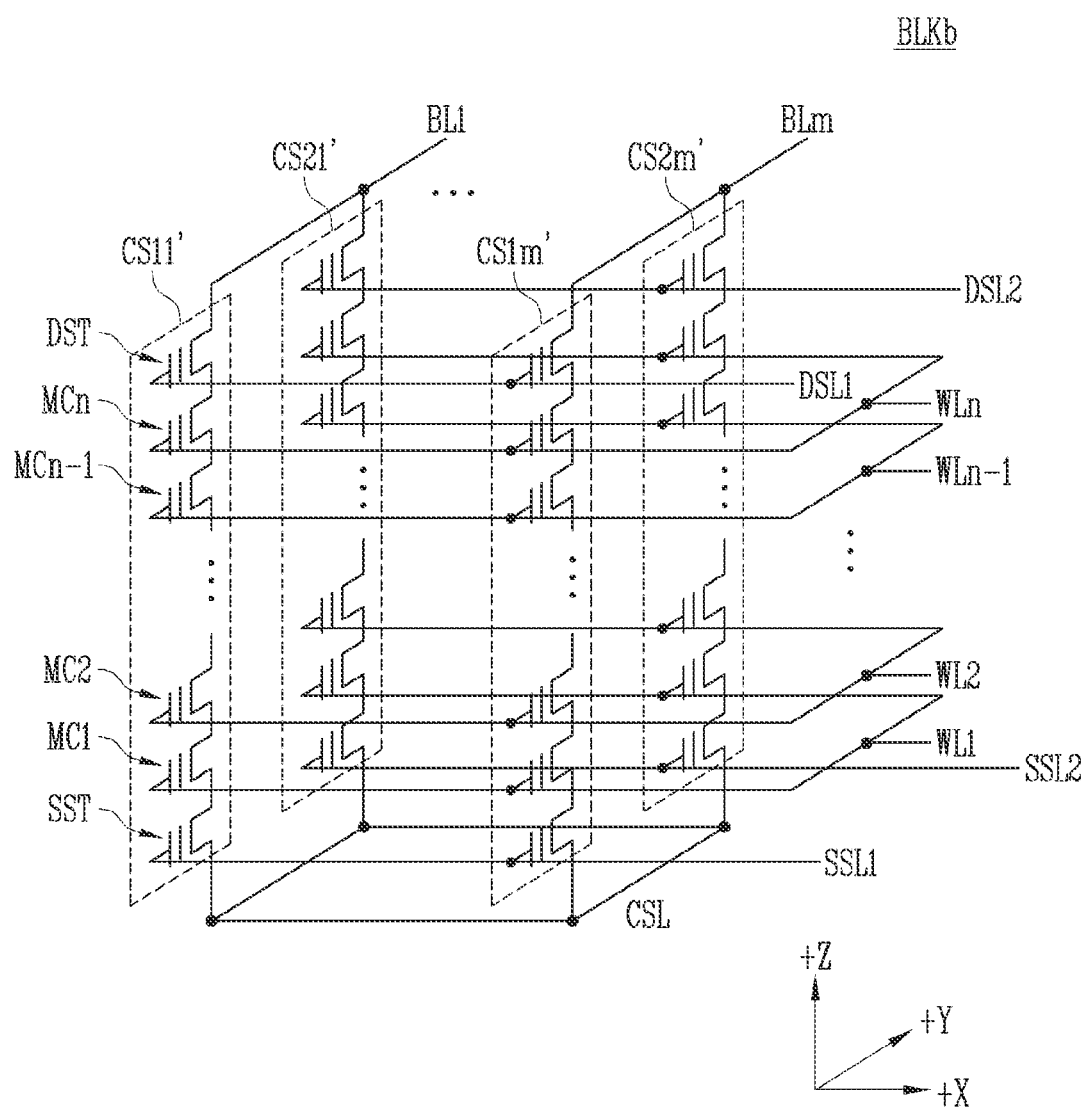
FIG. 5 is a circuit diagram illustrating a memory block BLKb among the memory blocks BLK1 to BLKz of FIG. 3 according to an embodiment of the present disclosure.

FIG. 5 is a circuit diagram illustrating a memory block BLKb among the memory blocks BLK1 to BLKz of FIG. 3 according to an embodiment of the present disclosure.

Referring to FIG. 5, the memory block BLKb includes a plurality of cell strings CS11' to CS1$m$' and CS21' to CS2$m$'. Each of the plurality of cell strings CS11' to CS1$m$' and CS21' to CS2$m$' extends along a +Z direction. Each of the plurality of cell strings CS11' to CS1$m$' and CS21' to CS2$m$' includes at least one source select transistor SST, first to n-th memory cells MC1 to MCn, and at least one drain select transistor DST stacked on a substrate (not shown) under the memory block BLKb.

The source select transistor SST of each cell string is connected between a common source line CSL and memory cells MC1 to MCn. The source select transistors of the cell strings arranged in the same row are connected to the same source select line. The source select transistors of the cell strings CS11' to CS1$m$' arranged in a first row are connected to a first source select line SSL1. The source select transistors of the cell strings CS21' to CS2$m$' arranged in a second row are connected to a second source select line SSL2. In another embodiment, the source select transistors of the cell strings CS11' to CS1$m$' and CS21' to CS2$m$' may be commonly connected to one source select line.

The first to n-th memory cells MC1 to MCn of each cell string are connected in series between the source select transistor SST and the drain select transistor DST. Gates of the first to n-th memory cells MC1 to MCn are connected to first to the n-th word lines WL1 to WLn, respectively.

The drain select transistor DST of each cell string is connected between a corresponding bit line and the memory cells MC1 to MCn. The drain select transistors of the cell strings arranged in the row direction are connected to a drain select line extending in the row direction. The drain select transistors of the cell strings CS11' to CS1m' of a first row are connected to a first drain select line DSL1. The drain select transistors of the cell strings CS21' to CS2m' of a second row are connected to a second drain select line DSL2.

As a result, the memory block BLKb of FIG. 5 has an equivalent circuit similar to that of the memory block BLKa of FIG. 4 except that the pipe transistor PT is excluded from each cell string.

In another embodiment, even bit lines and odd bit lines may be provided instead of the first to m-th bit lines BL1 to BLm. In addition, even-numbered cell strings among the cell strings CS11' to CS1m' or CS21' to CS2m' arranged in the row direction may be connected to even bit lines, and odd-numbered cell strings among the cell strings CS11' to CS1m' or CS21' to CS2m' arranged in the row direction may be connected to odd bit lines, respectively.

In an embodiment, at least one of the first to n-th memory cells MC1 to MCn may be used as a dummy memory cell. For example, at least one dummy memory cell is provided to reduce an electric field between the source select transistor SST and the memory cells MC1 to MCn. Alternatively, at least one dummy memory cell is provided to reduce an electric field between the drain select transistor DST and the memory cells MC1 to MCn. As more dummy memory cells are provided, reliability of an operation for the memory block BLKb is improved, however, the size of the memory block BLKb increases. As less memory cells are provided, the size of the memory block BLKb may be reduced, however, the reliability of the operation for the memory block BLKb may be reduced.

In order to efficiently control at least one dummy memory cell, each of the dummy memory cells may have a required threshold voltage. Before or after an erase operation for the memory block BLKb, program operations for all or a part of the dummy memory cells may be performed. When the erase operation is performed after the program operation is performed, the dummy memory cells may have the required threshold voltage by controlling a voltage applied to the dummy word lines connected to the respective dummy memory cells.

Figure 6:
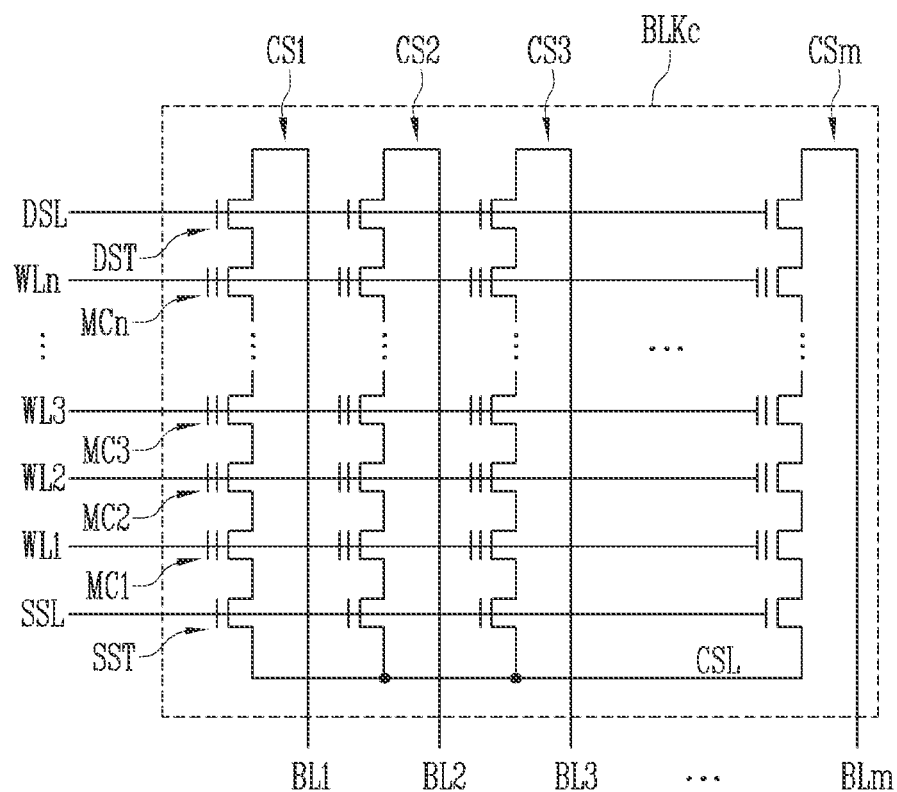
FIG. 6 is a circuit diagram illustrating a memory block BLKc among the memory blocks BLK1 to BLKz included in the memory cell array 110 of FIG. 2 according to an embodiment of the present disclosure.

FIG. 6 is a circuit diagram illustrating a memory block BLKc among the memory blocks BLK1 to BLKz included in the memory cell array 110 of FIG. 2 according to an embodiment of the present disclosure.

Referring to FIG. 6, the memory block BLKc includes a plurality of cell strings CS1 to CSm. The plurality of cell strings CS1 to CSm may be connected to a plurality of bit lines BL1 to BLm, respectively. Each of the cell strings CS1 to CSm includes at least one source select transistor SST, first to n-th memory cells MC1 to MCn, and at least one drain select transistor DST.

Each of the select transistors SST and DST and the memory cells MC1 to MCn may have a similar structure. In an embodiment, each of the select transistors SST and DST and the memory cells MC1 to MCn may include a channel layer, a tunneling insulating film, a charge storage film, and a blocking insulating film. In an embodiment, a pillar for providing the channel layer may be provided in each cell string. In an embodiment, a pillar for providing at least one of the channel layer, the tunneling insulating film, the charge storage film, and the blocking insulating film may be provided in each cell string.

The source select transistor SST of each cell string is connected between a common source line CSL and the memory cells MC1 to MCn.

The first to n-th memory cells MC1 to MCn of each cell string are connected between the source select transistor SST and the drain select transistor DST.

The drain select transistor DST of each cell string is connected between a corresponding bit line and the memory cells MC1 to MCn.

Memory cells connected to the same word line configure one page. The cell strings CS1 to CSm may be selected by selecting the drain select line DSL. One page among the selected cell strings may be selected by selecting any of the word lines WL1 to WLn.

In another embodiment, even bit lines and odd bit lines may be provided instead of the first to m-th bit lines BL1 to BLm. Even-numbered cell strings among the cell strings CS1 to CSm may be connected to even bit lines, and odd-numbered cell strings may be connected to odd bit lines, respectively.

Figure 7:
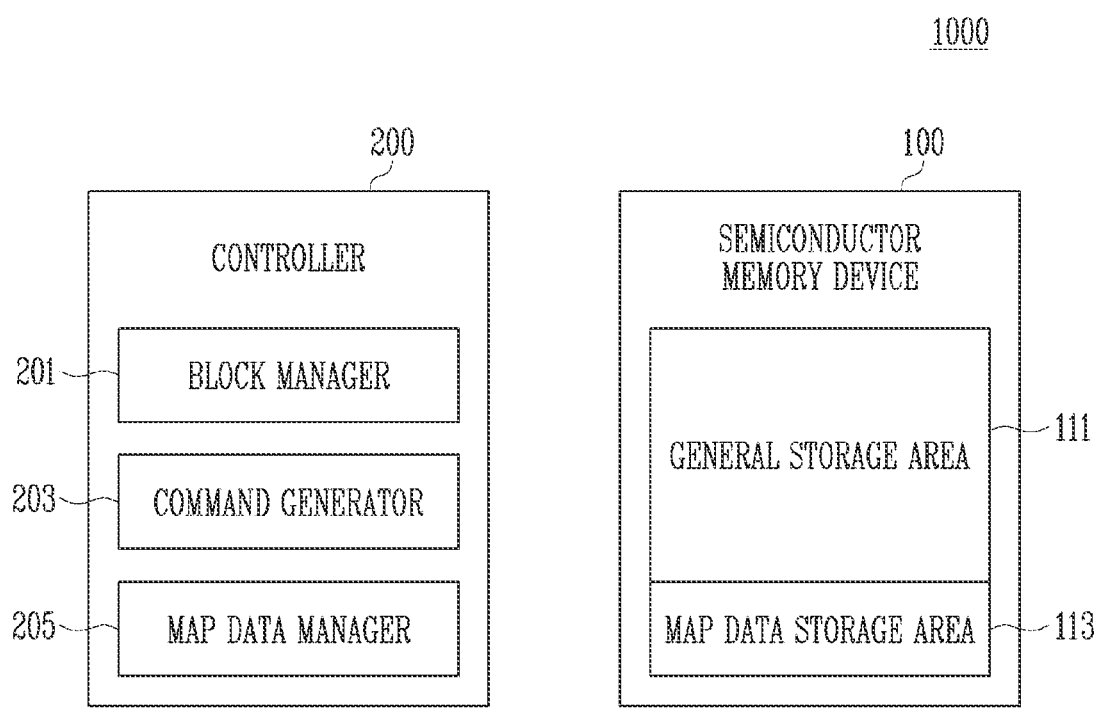
FIG. 7 is a block diagram illustrating the memory system shown in FIG. 1 according to an embodiment of the present disclosure.

FIG. 7 is a block diagram illustrating the memory system 1000 shown in FIG. 1 according to an embodiment of the present disclosure.

Referring to FIG. 7, the memory system 1000 includes the semiconductor memory device 100 and the controller 200. The memory cell array of the semiconductor memory device 100 may include a general storage area 111 and a map data storage area 113. In FIG. 7, a configuration except for the memory cell array of the semiconductor memory device 100 is omitted.

User data transmitted from the host 300 may be stored in the general storage area 111. Map data indicating a relationship between a physical address and a logical address of data stored in the general storage area 111 may be stored in the map data storage area 113.

The general storage area 111 and the map data storage area 113 shown in FIG. 7 may be data storage areas having an arbitrary size. In an embodiment, the general storage area 111 may include a plurality of memory blocks. In addition, in an embodiment, the map data storage area 113 may include at least one memory block.

The controller 200 according to an embodiment of the present disclosure may include a block manager 201, a command generator 203, and a map data manager 205.

The block manager 201 may store information on the plurality of memory blocks included in the semiconductor memory device 100. For example, the block manager 201 may include information on open blocks included in the semiconductor memory device 100, information on free blocks, or information on closed blocks. In the present specification, a memory block in which data is stored in some pages and data is not stored in some pages may be referred to as the "open block". In addition, in the present specification, a memory block in which data is not stored in all pages may be referred to as the "free block". In the present specification, a memory block in which data is stored in all pages may be referred to as the "closed block".

When the erase operation is performed on the memory block and data of all pages is erased, the corresponding memory block may become the free block. When data is stored in some pages of the free block, the free block is changed to the open block. When data is continuously stored in the open block and valid data or invalid data is stored in all pages, the corresponding open block may not store data any more. At this time, the corresponding open block is changed to the closed block. The block manager 201 may store information indicating whether each of the memory blocks included in the semiconductor memory device 100 is the free block, the open block, or the closed block.

The command generator 203 may generate commands for controlling the operation of the semiconductor memory device 100. For example, in order to control the read operation of the semiconductor memory device 100, the command generator 203 may generate a read command. As another example, in order to control the program operation of the semiconductor memory device 100, the command generator 203 may generate a program command. In order to control the erase operation of the semiconductor memory device 100, the command generator 203 may generate an erase command. The generated read command, program command, or erase command may be transmitted to the semiconductor memory device 100 together with a corresponding address.

The map data manager 205 may manage the map data indicating the relationship between the physical address and the logical address of the data stored in the semiconductor memory device 100.

As an example, the map data manager 205 may store some of the map data stored in the map data storage area. When data is stored in the general storage area of the semiconductor memory device 100, the map data manager 205 may generate or update the map data corresponding to the stored data. The generated or updated map data may be transmitted to the semiconductor memory device 100 together with the program command generated by the command generator 203. The semiconductor memory device 100 may receive the program command and corresponding map data from the controller 200. The semiconductor memory device 100 may store the map data in the map data storage area 113 in response to the received program command.

Figure 8:
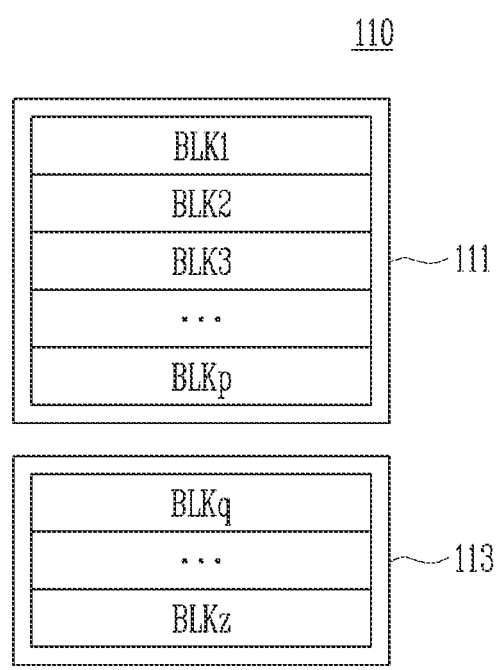
FIG. 8 is a diagram illustrating a general storage area and a map data storage area according to an embodiment of the present disclosure.

FIG. 8 is a diagram illustrating the general storage area and the map data storage area according to an embodiment of the present disclosure.

As described above, the memory cell array 110 may include the general storage area 111 and the map data storage area 113. The general storage area 111 and the map data storage area 113 may be data storage areas of an arbitrary size. In an embodiment, the general storage area 111 may include a plurality of memory blocks. In an example of FIG. 8, the general storage area 111 includes first to p-th memory blocks BLK1 to BLKp. When receiving data together with a write request from the host, the controller 200 may control the semiconductor memory device 100 to program the received data to at least one of the memory blocks included in the general storage area 111.

In addition, in an embodiment, the map data storage area 113 may include at least one memory block. In the example of FIG. 8, the map data storage area 113 includes q-th to z-th memory blocks BLKq to BLKz.

When the map data is generated or updated by the map data manager 205, the controller 200 may control the semiconductor memory device 100 to store the map data. To this end, the controller 200 may transmit the generated or updated map data to the semiconductor memory device 100 together with the program command. At this time, the controller 200 may transmit a physical address in which the map data is to be stored to the semiconductor memory device 100 together. In response to the received program command, the semiconductor memory device 100 may program the map data in a memory block corresponding to the received address among the q-th to z-th memory blocks BLKq to BLKz.

In an embodiment, the controller 200 may control the semiconductor memory device 100 to store the map data when any of the memory blocks included in the general storage area 111 is changed from the open block to the closed block. Therefore, the map data may be efficiently managed when a capacity of a random access memory (RAM) included in the controller 200 is small.

Figure 9:
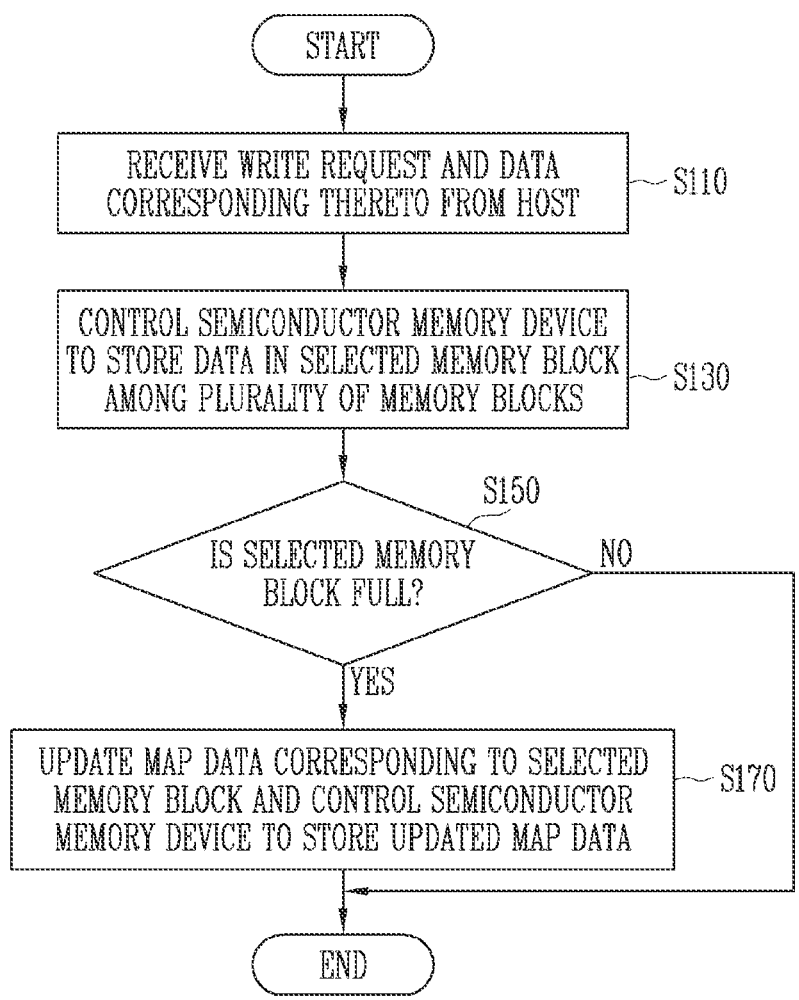
FIG. 9 is a flowchart illustrating a method of operating a controller according to an embodiment of the present disclosure.

FIG. 9 is a flowchart illustrating a method of operating a controller according to an embodiment of the present disclosure.

Referring to FIG. 9, the method of operating the controller according to an embodiment of the present disclosure includes receiving the write request from the host and data corresponding thereto (S110), controlling the semiconductor memory device 100 to store the data in a selected memory block among the plurality of memory blocks (S130), and determining whether the selected memory block is full (S150). The method of operating the controller according to an embodiment of the present disclosure may further include updating map data corresponding to the selected memory block and controlling the semiconductor memory device 100 to store the updated map data when the selected memory block is full (S150: Yes).

In operation S110, the controller 200 may receive the write request and the data corresponding thereto from the host 300. The data received from the host 300 is the user data and data to be stored in the general storage area 111 of the semiconductor memory device 100.

In operation S130, in response to the write request, the controller 200 may control the semiconductor memory device 100 to store the user data in the selected memory block among the memory blocks included in the general storage area 111 of the semiconductor memory device 100. To this end, the controller 200 may generate the program command for storing the data received from the host 300 and transmit the generated program command to the semiconductor memory device 100 together with the data. The semiconductor memory device 100 may program the data to the selected memory block in response to the received program command.

In operation S150, the controller 200 determines whether the selected memory block is full, that is, whether the selected memory block is changed from the open block to the closed block. When the selected memory block is changed from the open block to the closed block (S150: Yes), the controller 200 updates the map data corresponding to the selected memory block and controls the semiconductor memory device 100 to store the updated map data (S170). More specifically, as the data received from the host is stored in the general storage area 111 of the semiconductor memory device 100 (S130), the map data manager 205 of the controller 200 may generate or update the map data. The command generator 203 may generate the program command for controlling the semiconductor memory device 100 to store the generated or updated map data in the map data storage area 113. The controller 200 may transmit the generated or updated map data to the semiconductor memory device 100 together with the program command. In response to the program command, the semiconductor memory device 100 may program the received map data to at least one of the q-th to z-th memory blocks BLKq to BLKz.

When the selected memory block is not yet full (S150: No), that is, when the selected memory block maintains an open block state, operation S170 may not be performed.

According to the embodiment shown in FIG. 9, when any of the memory blocks included in the general storage area 111 is changed from the open block to the closed block, the controller 200 may control the semiconductor memory device 100 to store the map data. Therefore, the map data may be efficiently managed when the capacity of the RAM included in the controller 200 is small.

Figure 10A:
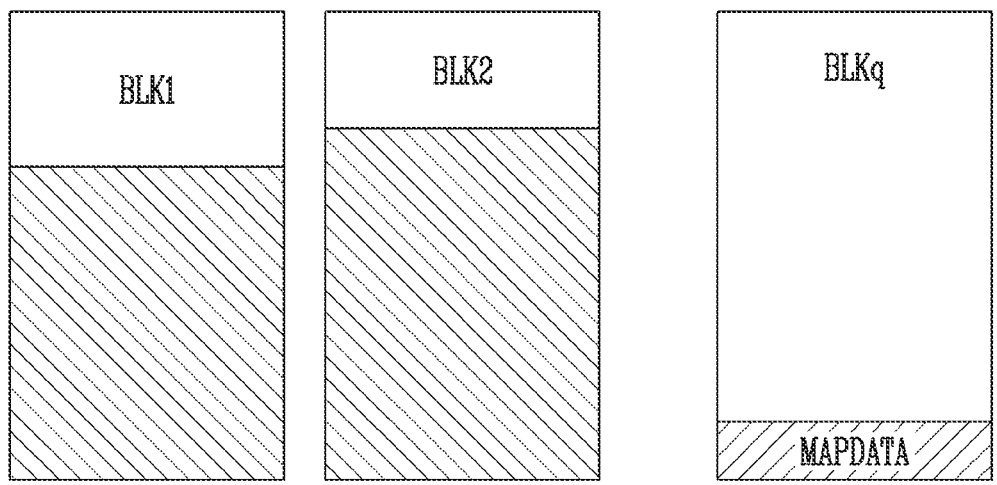
FIGS. 10A, 10B, and 10C are diagrams illustrating the method of operating the controller shown in FIG. 9 according to an embodiment of the present disclosure.
Figure 10B:
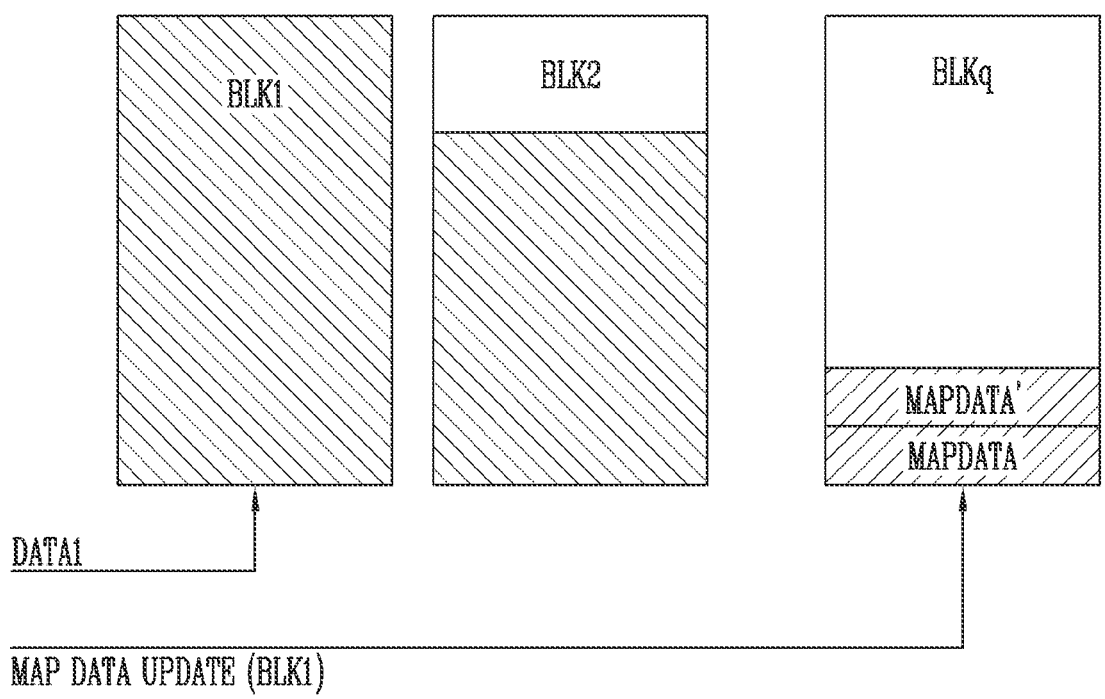
Figure 10C:
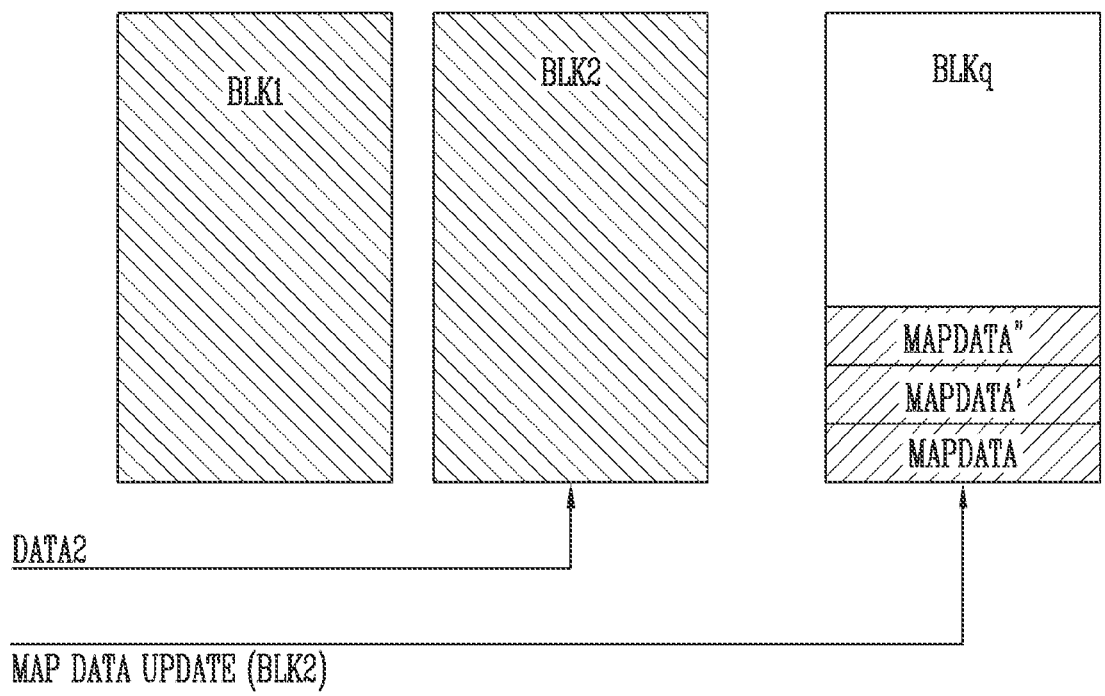

FIGS. 10A, 10B, and 10C are diagrams illustrating the method of operating the controller shown in FIG. 9 according to an embodiment of the present disclosure.

Referring to FIGS. 10A to 10C, the first memory block BLK1 and the second memory block BLK2 belonging to the general storage area 111 and the q-th memory block BLKq belonging to the map data storage area 113 are shown. For convenience of description, an illustration of the memory blocks except for the first memory block BLK1, the second memory block BLK2, and the q-th memory block BLKq is omitted. In FIGS. 10A to 10C, a hatched area of each memory block indicates an area in which data is stored, and a white area indicates an area in which data is not stored. For example, in FIG. 10A, data is stored in some areas and data is not stored in other areas of both of the first and second memory blocks BLK1 and BLK2. That is, as shown in FIG. 10A, both of the first and second memory blocks BLK1 and BLK2 are the open blocks. According to FIG. 10A, the q-th memory block BLKq is also the open block, and map data MAPDATA is stored in some areas.

A situation in which the controller 200 generates a program command for storing data DATA1 in the first memory block BLK1 and transmits the program command to the semiconductor memory device 100 (S130) is shown. Referring to FIG. 10B, in response to the program command received from the controller 200, the data DATA1 is programmed to the first memory block BLK1. As the data DATA1 is programmed to the first memory block BLK1, the first memory block BLK1 becomes a full state (S150: Yes). Therefore, the controller 200 updates the map data, generates a program command for storing the updated map data in the q-th memory block BLKq, and transmits the program command to the semiconductor memory device 100 (S170). Accordingly, updated map data MAPDATA' corresponding to the first memory block BLK1 is stored in the q-th memory block BLKq.

Thereafter, as shown in FIG. 10C, a situation in which the controller 200 generates a program command for storing data DATA2 in the second memory block BLK2 and transmits the program command to the semiconductor memory device 100 (S130) is shown. Referring to FIG. 10C, in response to the program command received from the controller 200, the data DATA2 is programmed to the second memory block BLK2. As the data DATA2 is programmed to the second memory block BLK2, the second memory block BLK2 becomes a full state (S150: Yes). Therefore, the controller 200 updates the map data, generates a program command for storing the updated map data in the q-th memory block BLKq, and transmits the program command to the semiconductor memory device 100 (S170). Accordingly, updated map data MAPDATA" corresponding to the second memory block BLK2 is stored in the q-th memory block BLKq.

As described with reference to FIGS. 10A to 10C, in a case where a little available space of a second memory block BLK2 remains at a time point when the first memory block BLK1 is changed from the open block to the closed block, the second memory block BLK2 is also highly likely to be changed to the closed block within a short time. As the map data is frequently updated and stored in the semiconductor memory device 100, the entire performance of the memory system 1000 may decrease. Conversely, as a period in which the map data is updated and stored in the semiconductor memory device 100 increases, the performance of the memory system 1000 may be improved.

Therefore, when a plurality of open blocks in which a little available space remains exist, an operation of updating the map data and storing the updated map data in the semiconductor memory device 100 may be frequently performed afterwards. This may be a cause of reducing the performance of the memory system 1000.

In accordance with another embodiment of the present disclosure, when any of the memory blocks included in the semiconductor memory device 100 is changed from the open block to the closed block as the data received from the host 300 is stored, the semiconductor memory device 100 is controlled to store dummy data in another open block in which a little available space remains. Thereafter, an operation of updating map data for two or more memory blocks changed to the closed block and an operation of storing the updated map data in the semiconductor memory device 100 are collectively performed. Accordingly, a performance frequency of the operation of updating the map data and the operation of storing the updated map data in the semiconductor memory device 100 may be reduced. As a result, the performance of the memory system 1000 is improved.

Figure 11:
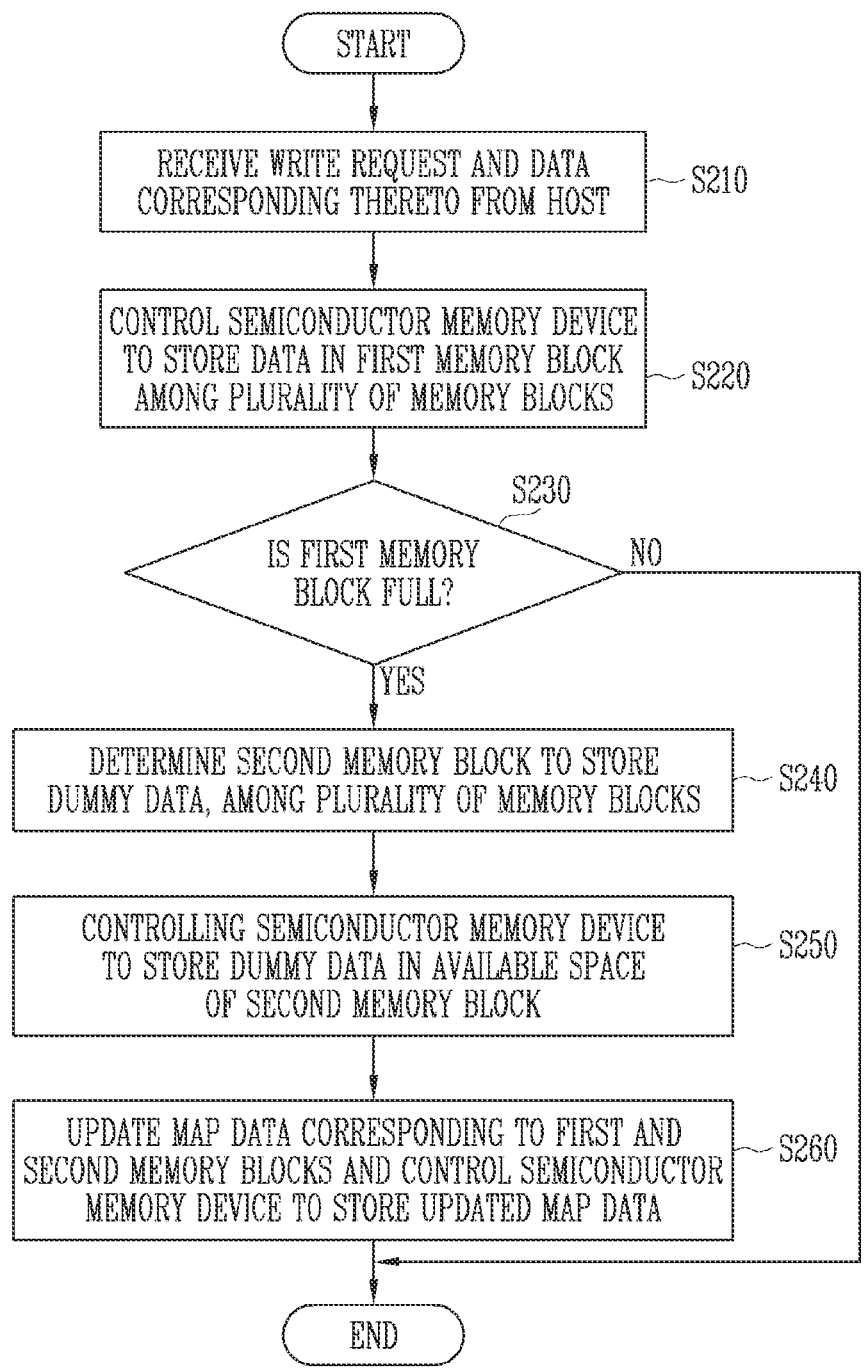
FIG. 11 is a flowchart illustrating a method of operating a controller according to another embodiment of the present disclosure.

FIG. 11 is a flowchart illustrating a method of operating a controller according to another embodiment of the present disclosure.

Referring to FIG. 11, the method of operating the controller according to an embodiment of the present disclosure includes receiving from the host the write request and data corresponding thereto (S210), controlling the semiconductor memory device 100 to store the data in a first memory block among the plurality of memory blocks (S220), and determining whether the first memory block is full (S230).

The method of operating the controller according to an embodiment of the present disclosure may further include determining a second memory block, in which dummy data is to be stored, from among the plurality of memory blocks (S240), controlling the semiconductor memory device 100 to store the dummy data in an available space of the second memory block (S250), and updating map data corresponding to the first and second memory blocks and controlling the semiconductor memory device 100 to store the updated map data (S260), when the first memory block is full (S230: Yes).

In operation S210, the controller 200 may receive the write request and the data corresponding thereto from the host 300. The data received from the host 300 is the user data and data to be stored in the general storage area 111 of the semiconductor memory device 100.

In operation S220, in response to the write request, the controller 200 may control the semiconductor memory device 100 to store the user data in the first memory block among the memory blocks included in the general storage area 111 of the semiconductor memory device 100. To this end, the controller 200 may generate the program command for storing the data received from the host 300 and transmit the generated program command to the semiconductor memory device 100 together with the data. The semiconductor memory device 100 may program the data to the first memory block in response to the received program command.

In operation S230, the controller 200 determines whether the first memory block is full, that is, whether the selected first memory block is changed from the open block to the closed block. When the first memory block is changed from the open block to the closed block (S230: Yes), the controller 200 determines the second memory block, in which the dummy data is to be stored, from among the memory blocks included in the general storage area 111 (S240). In operation S240, an open block in which a little available space remains among the memory blocks included in the general storage area 111 may be determined as the second memory block.

In operation S250, the controller 200 controls the semiconductor memory device 100 to store the dummy data in the determined second memory block. In this case, the dummy data is data of a size that occupies all of the available space of the second memory block. As operation S250 is performed, the second memory block is full, and thus the second memory block is also changed from the open block to the closed block.

Thereafter, the controller 200 updates map data corresponding to the first memory block and the second memory block changed to the closed block and stores the updated map data (S260). More specifically, the map data manager 205 of the controller 200 may generate or update the map data for the first and second memory blocks. The command generator 203 may generate the program command for controlling the semiconductor memory device 100 to store the generated or updated map data in the map data storage area 113. The controller 200 may transmit the generated or updated map data to the semiconductor memory device 100 together with the program command. In response to the program command, the semiconductor memory device 100 may program the received map data to at least one of the q-th to z-th memory blocks BLKq to BLKz.

When the first memory block is not yet full (S230: No), that is, when the first memory block maintains an open block state, operations S240 to S260 may not be performed.

According to the embodiment shown in FIG. 11, when any of the memory blocks included in the general storage area 111 is changed from the open block to the closed block, the controller 200 may control the semiconductor memory device 100 to store the map data. Therefore, the map data may be efficiently managed when the capacity of the RAM included in the controller 200 is small.

In addition, according to the embodiment shown in FIG. 11, when any of the memory blocks included in the general storage area 111 is changed from the open block to the closed block, the controller 200 controls the semiconductor memory device 100 to select the second memory block in which a little available space remains and store the dummy data in the second memory block. Therefore, the second memory block in which a little available space remains is forcibly changed to a closed state.

Thereafter, the controller may perform an operation of updating the map data for the first memory block and the second memory block and an operation of storing the updated map data in the semiconductor memory device 100 at one time. Accordingly, a performance frequency of the operation of updating the map data and the operation of storing the updated map data in the semiconductor memory device 100 may be reduced. As a result, the performance of the memory system 1000 is improved.

Figure 12:
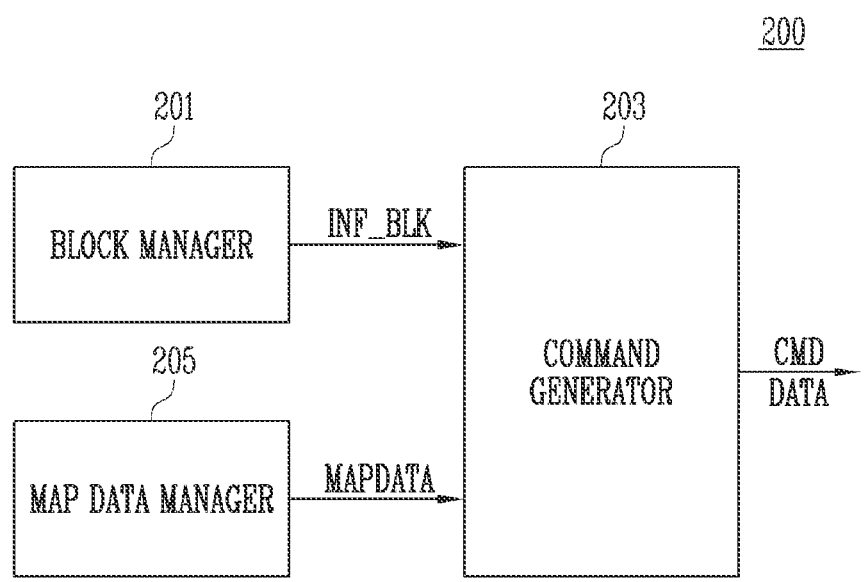
FIG. 12 is a block diagram illustrating a controller according to still another embodiment of the present disclosure.

FIG. 12 is a block diagram illustrating a controller according to still another embodiment of the present disclosure.

As described above with reference to FIG. 7, the block manager 201 may store information on the plurality of memory blocks included in the semiconductor memory device 100. For example, the block manager 201 may include the information on the open blocks, the free blocks, or the closed blocks included in the semiconductor memory device 100. The block manager 201 may manage block information INF_BLK, which is information on the memory blocks. In addition, the block manager 201 may transmit the block information INF_BLK to the command generator 203.

The command generator 203 may generate a command CMD for controlling an operation of the semiconductor memory device 100. The command generator 203 may transmit the generated command CMD to the semiconductor memory device 100. When the generated command CMD is a program command, the command generator 203 may transmit data DATA to be programmed to the semiconductor memory device 100 together with the command CMD. As an example, the data DATA shown in FIG. 12 may be the user data received from the host 300.

The map data manager 205 may manage the map data MAPDATA indicating the relationship between the physical address and the logical address of the data stored in the semiconductor memory device 100. When the map data MAPDATA is to be programmed to the semiconductor memory device 100, the map data manager 205 may transmit the map data MAPDATA to the command generator 203. In this case, the command generator 203 may transmit the received map data MAPDATA to the semiconductor memory device 100 as the data DATA to be programmed.

The command generator 203 may determine a memory block to store dummy data, based on the block information INF_BLK received from the block manager 201. As described above with reference to FIG. 11, when the first memory block becomes full of data (S230: Yes), the command generator 203 of the controller 200 may determine the second memory block to store the dummy data among the plurality of memory blocks (S240). The block information INF_BLK received from the block manager 201 may be used to determine the second memory block.

The command generator 203 may generate a program command for storing the dummy data in the determined second memory block and transmit the generated program command to the semiconductor memory device together with the dummy data (S250). The semiconductor memory device 100 may store the dummy data in the second memory block in response to the received program command. Accordingly, the second memory block may be changed from the open block to the closed block. Thereafter, the map data manager 205 may update the map data corresponding to the first and second memory blocks. The updated map data may be transmitted to the command generator 203.

Figure 13A:
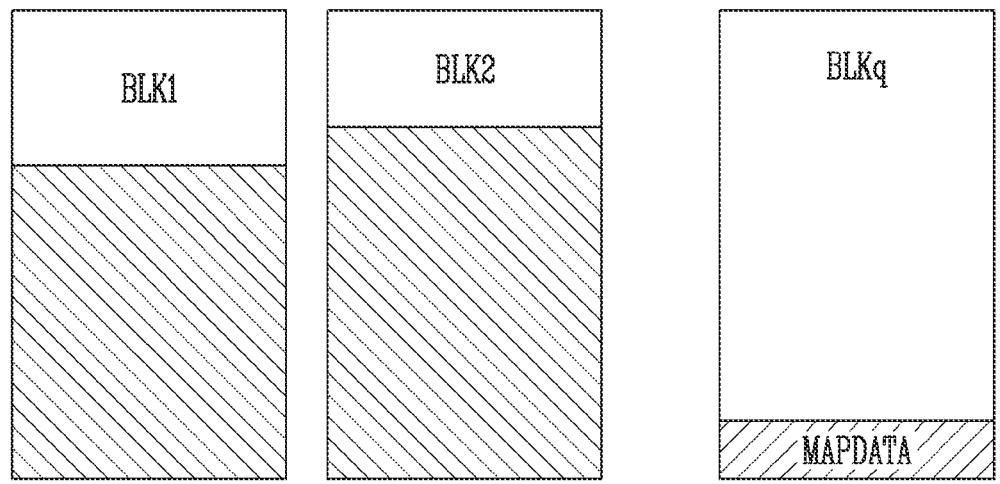
FIGS. 13A, 13B, and 13C are diagrams illustrating a method of operating the controller shown in FIG. 12 according to an embodiment of the present disclosure.
Figure 13B:
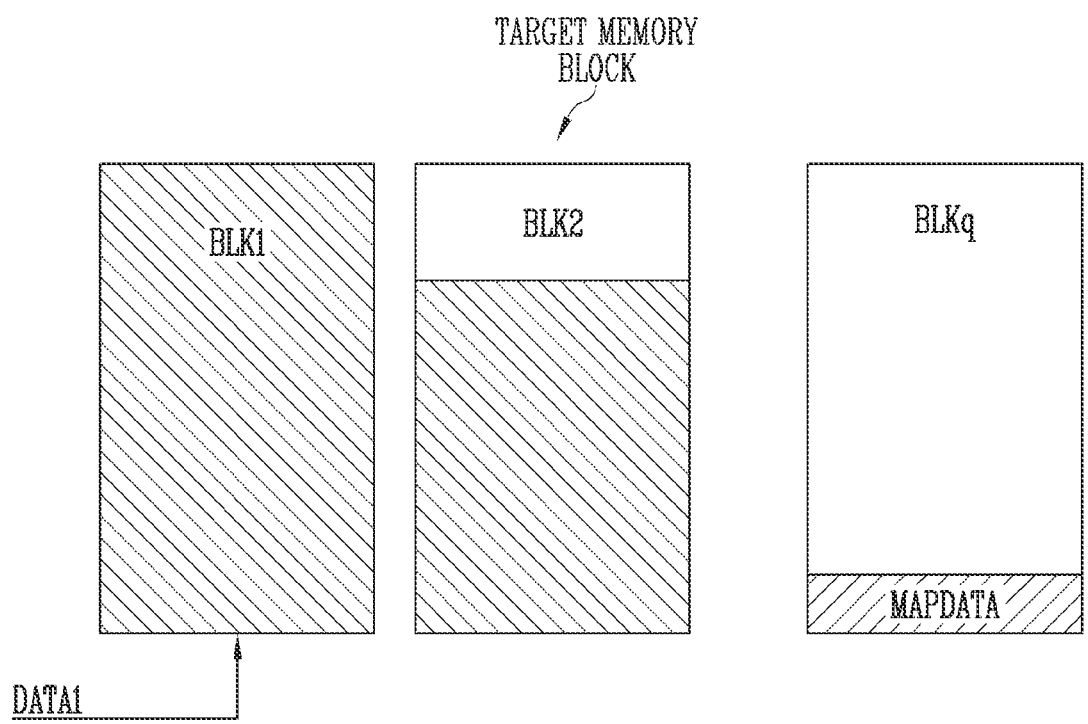
Figure 13C:
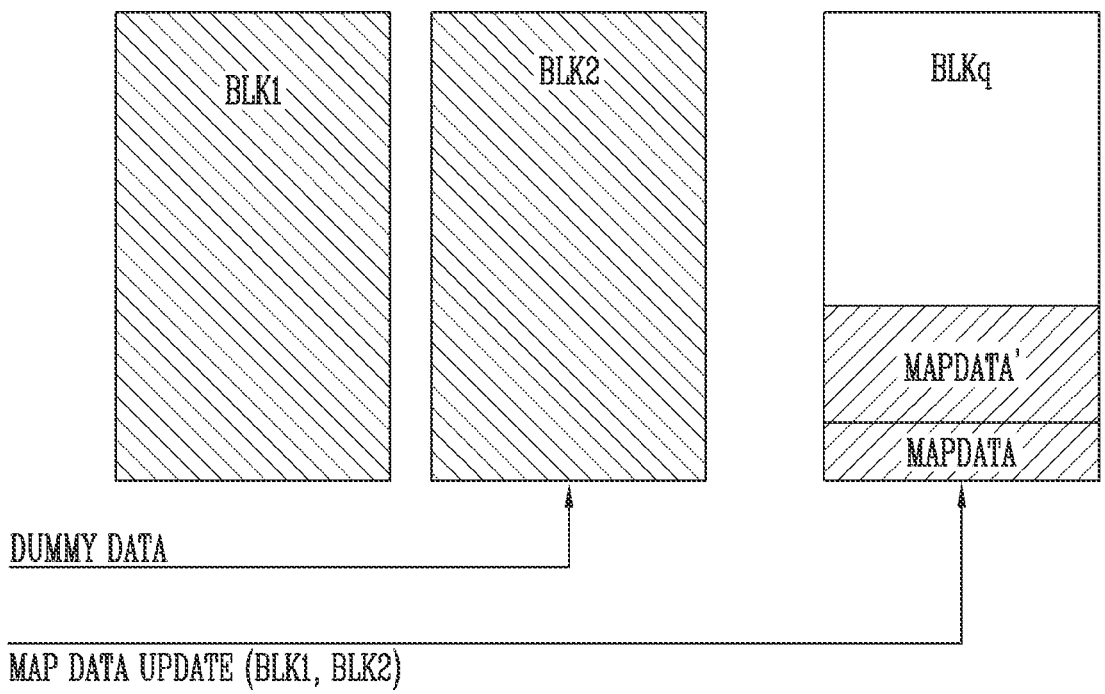

FIGS. 13A, 13B, and 13C are diagrams illustrating a method of operating the controller shown in FIG. 11 according to an embodiment of the present disclosure.

Referring to FIGS. 13A to 13C, the first memory block BLK1 and the second memory block BLK2 belonging to the general storage area 111 and the q-th memory block BLKq belonging to the map data storage area 113 are shown. For convenience of description, an illustration of the memory blocks except for the first memory block BLK1, the second memory block BLK2, and the q-th memory block BLKq is omitted. In FIGS. 13A to 13C, a hatched area of each memory block indicates an area in which data is stored, and a white area indicates an area in which data is not stored. For example, in FIG. 13A, data is stored in some areas and data is not stored in other areas of both of the first and second memory blocks BLK1 and BLK2. That is, as shown in FIG. 13A, both of the first and second memory blocks BLK1 and BLK2 are the open blocks. According to FIG. 13A, the q-th memory block BLKq is also the open block, and map data MAPDATA is stored in some areas.

A situation in which the controller 200 generates a program command for storing data DATA1 in the first memory block BLK1 and transmits the program command to the semiconductor memory device 100 (S220) is shown. Referring to FIG. 13B, in response to the program command received from the controller 200, the data DATA1 is programmed to the first memory block BLK1. As the data DATA1 is programmed to the first memory block BLK1, the first memory block BLK1 becomes a full state (S230: Yes). Therefore, the controller 200 determines the second memory block to store the dummy data from among the plurality of memory blocks (S240). In the example of FIGS. 13A to 13C, the second memory block BLK2 is determined as the memory block to store the dummy data. That is, the second memory block BLK2 is determined as a target memory block for storing the dummy data.

Thereafter, as shown in FIG. 13C, the controller 200 controls the semiconductor memory device to store the dummy data in an available space of the second memory block BLK2 (S250). Accordingly, the second memory block BLK2 becomes a full state. Since the first and second memory blocks BLK1 and BLK2 are changed from the open block to the closed block, the updated map data MAPDATA' corresponding to the first and second memory blocks BLK1 and BLK2 is stored in the q-th memory block BLKq (S260).

As described with reference to FIGS. 13A to 13C, in a case where a little available space of a second memory block BLK2 remains at a time point when the first memory block BLK1 is changed from the open block to the closed block, the controller 200 controls the semiconductor memory device 100 to store the dummy data in the second memory block BLK2. Accordingly, the second memory block BLK2 is artificially changed from the open block state to the closed block state. Thereafter, an operation of updating map data for two or more memory blocks changed to the closed block and an operation of storing the updated map data in the semiconductor memory device 100 are collectively performed. Accordingly, a performance frequency of the operation of updating the map data and the operation of storing the updated map data in the semiconductor memory device 100 may be reduced. As a result, the performance of the memory system 1000 is improved.

Figure 14:
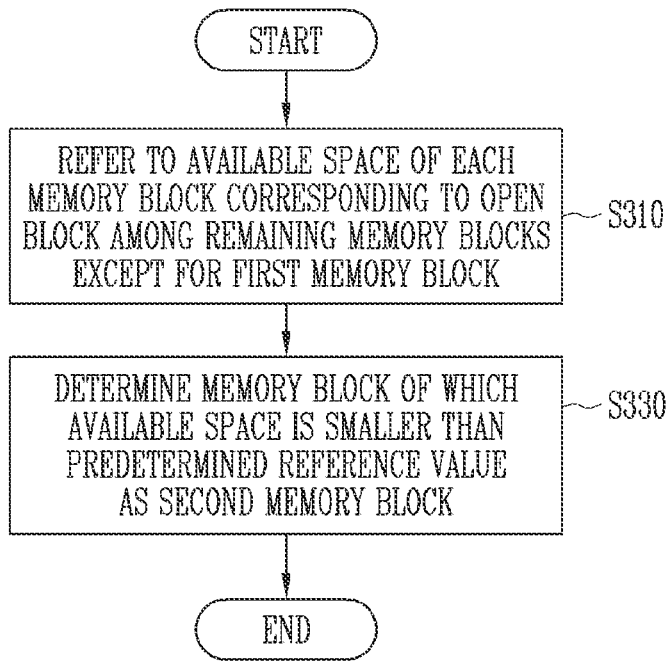
FIG. 14 is a flowchart illustrating an example of operation S240 of FIG. 11 according to an embodiment of the present disclosure.

FIG. 14 is a flowchart illustrating an example of operation S240 of FIG. 11 according to an embodiment of the present disclosure. That is, FIG. 14 illustrates an embodiment in which the second memory block to store the dummy data is determined from among the plurality of memory blocks.

Referring to FIG. 14, operation S240 of FIG. 11 includes referring to the available space of each memory block corresponding to the open block among the remaining memory blocks except for the first memory block (S310), and determining a memory block of which an available space is smaller than a predetermined reference value as the second memory block (S330).

In operation S310, the command generator 203 may receive the block information INF_BLK received from the block manager 201. The command generator 203 may refer to the available space of each memory block corresponding to the open block through the block information INF_BLK.

In operation S330, the command generator 203 may determine the memory block of which the available space is smaller than the predetermined reference value as the second memory block among the memory blocks corresponding to the open block. That is, among the open blocks, the memory block of which the available space is smaller than the predetermined reference value may be determined as the second memory block.

In a specific situation, one second memory block may be determined in operation S330. In this case, in operation S250, the controller 200 may control the semiconductor memory device 100 to store the dummy data in one determined second memory block. Thereafter, the map data corresponding to the first and second memory blocks, that is, the two memory blocks, may be updated, and the updated map data may be stored in the semiconductor memory device (S260).

In another situation, two or more second memory blocks may be determined in operation S330. In this case, in operation S250, the controller 200 may control the semiconductor memory device 100 to store the dummy data in the two or more determined second memory blocks. Thereafter, map data corresponding to the first and the plurality of second memory blocks, that is, three or more memory blocks, may be updated, and the updated map data may be stored in the semiconductor memory device (S260).

In still another situation, the second memory block determined in operation S330 may not exist. That is, the available space of all open blocks may be larger than the predetermined reference value. In this case, the dummy data may not be stored, and only map data corresponding to the first memory block may be updated and the updated map data may be stored in the semiconductor memory device.

Figure 15:
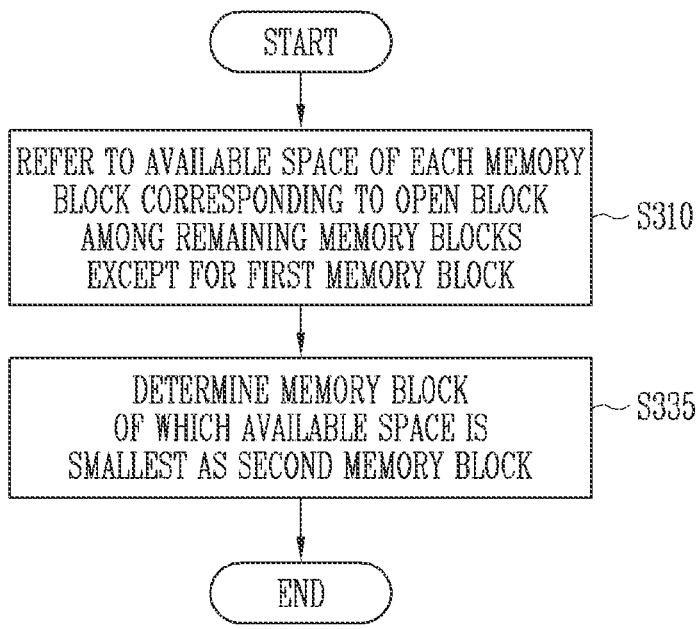
FIG. 15 is a flowchart illustrating another example of operation S240 of FIG. 11 according to an embodiment of the present disclosure.

FIG. 15 is a flowchart illustrating another example of operation S240 of FIG. 11 according to an embodiment of the present disclosure. That is, FIG. 15 illustrates another embodiment in which the second memory block to store the dummy data is determined from among the plurality of memory blocks.

Referring to FIG. 15, operation S240 of FIG. 11 includes referring to the available space of each memory block corresponding to the open block among the remaining memory blocks except for the first memory block (S310), and determining a memory block of which an available space is the smallest among the open blocks as the second memory block (S335).

In operation S310, the command generator 203 may receive the block information INF_BLK received from the block manager 201. The command generator 203 may refer to the available space of each memory block corresponding to the open block through the block information INF_BLK. Operation S310 of FIG. 15 may be performed in substantially the same method as operation S310 of FIG. 14.

In operation S335, the command generator 203 may determine the memory block of which the available space is the smallest as the second memory block among the memory blocks corresponding to the open block. That is, among the open blocks, the memory block of which the available space is a minimum may be determined as the second memory block. In this case, one memory block is determined as the second memory block in operation S335. In operation S250, the controller 200 may control the semiconductor memory device 100 to store the dummy data in one determined second memory block. Thereafter, the map data corresponding to the first and second memory blocks, that is, the two memory blocks, may be updated, and the updated map data may be stored in the semiconductor memory device (S260).

In an embodiment, the general storage area 111 may include at least one single-level cell (SLC) block and at least one multi-level cell (MLC) block. According to an embodiment, the SLC block may be used as a buffer memory block. That is, data transmitted to the semiconductor memory device 100 may be first stored in the SLC block. As data is continuously stored in the SLC block, when the SLC block becomes a full state, the data stored in the SLC block may be transferred to the MLC block.

As another example, the general storage area 111 may include at least one SLC block and at least one triple-level cell (TLC) block. According to an embodiment, the SLC block may be used as a buffer memory block. That is, the data transmitted to the semiconductor memory device 100 may be first stored in the SLC block. As data is continuously stored in the SLC block, when the SLC block becomes a full state, the data stored in the SLC block may be transferred to the TLC block.

In the embodiment of FIGS. 14 and 15, the second memory block may be determined among the SLC blocks. As described above, in an embodiment, the semiconductor memory device 100 may include both of the SLC block and the MLC block. In this case, the second memory block that becomes a storage target of the dummy data may be selected from among SLC blocks of an open block state. More specifically, when the MLC block is full, the SLC block may be determined as the second memory block. In still another embodiment, the semiconductor memory device 100 may include both the SLC block and the TLC block. In this case, the second memory block that becomes a storage target of the dummy data may be selected from among the SLC blocks of the open block state. More specifically, when the TLC block is full, the SLC block may be determined as the second memory block.

According to still another embodiment, the second memory block may be determined from the MLC block or the TLC block. For example, the semiconductor memory device 100 may include the SLC block and the MLC block. In this case, when the SLC block is full, any of the MLC blocks of an open block state may be determined as the second memory block. As still another example, the semiconductor memory device 100 may include the SLC block and the TLC block. In this case, when the SLC block is full, any of the TLC blocks of an open block state may be determined as the second memory block.

Figure 16:
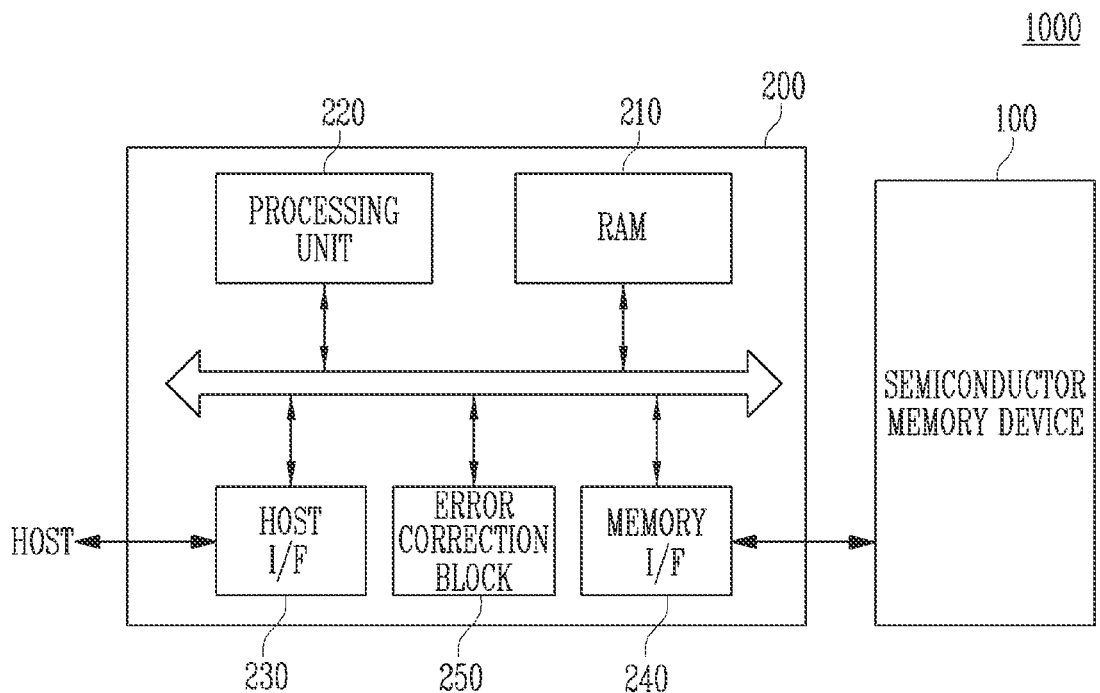
FIG. 16 is a block diagram illustrating an example of the controller shown in FIG. 1 according to an embodiment of the present disclosure.

FIG. 16 is a block diagram illustrating an example of the controller shown in FIG. 1 according to an embodiment of the present disclosure.

Referring to FIG. 16, the controller 200 is connected to the semiconductor memory device 100 and a host Host. The semiconductor memory device 100 may be the semiconductor memory device described with reference to FIG. 2. The controller 200 corresponds to the controller 200 of FIG. 1 or FIG. 7. Hereinafter, a repetitive description is omitted.

The controller 200 is configured to access the semiconductor memory device 100 in response to a request from the host Host. For example, the controller 200 is configured to control read, write, erase, and background operations of the semiconductor memory device 100. The controller 200 is configured to provide an interface between the semiconductor memory device 100 and the host Host. The controller 200 is configured to drive firmware for controlling the semiconductor memory device 100.

The controller 200 includes a random access memory (RAM) 210, a processing unit 220, a host interface 230, a memory interface 240, and an error correction block 250. The RAM 210 is used as at least one of an operation memory of the processing unit 220, a cache memory between the semiconductor memory device 100 and the host Host, and a buffer memory between the semiconductor memory device 100 and the host Host. In addition, the RAM 210 may be used as a command queue temporarily storing commands to be transmitted to the semiconductor memory device 100. In an embodiment, the RAM 210 may include at least one of a static random access memory (SRAM) and a dynamic access random access memory (DRAM).

The processing unit 220 controls an overall operation of the controller 200. According to an embodiment, the block manager 201 and the map data manager 205 shown in FIGS. 7 and 12 may be implemented in a form of firmware driven by the processing unit 220. The block manager 201 may store the block information INF_BLK in the RAM 210, and the map data manager 205 may store the generated or updated map data MAPDAT in the RAM 210.

The host interface 230 includes a protocol for performing data exchange between the host Host and the controller 200. In an embodiment, the controller 200 is configured to communicate with the host Host through at least one of various communication standards or interfaces such as a universal serial bus (USB) protocol, a multimedia card (MMC) protocol, a peripheral component interconnection (PCI) protocol, a PCI-express (PCI-e or PCIe) protocol, an advanced technology attachment (ATA) protocol, a serial ATA protocol, a parallel ATA protocol, a small computer system interface (SCSI) protocol, an enhanced small disk interface (ESDI) protocol, an integrated drive electronics (IDE) protocol, and a private protocol.

The memory interface 240 interfaces with the semiconductor memory device 100. For example, the memory interface 1240 includes a NAND interface or a NOR interface. According to an embodiment, the command generator 203 shown in FIGS. 7 and 12 may be implemented with the memory interface 240.

The error correction block 250 is configured to detect and correct an error of data received from the semiconductor memory device 100 using an error correcting code (ECC). The processing unit 220 may control the semiconductor memory device 100 to adjust the read voltage and perform a re-read according to an error detection result of the error correction block 250. In an embodiment, the error correction block may be provided as a component of the controller 200.

The controller 200 and the semiconductor memory device 100 may be integrated into one semiconductor device. In an embodiment, the controller 200 and the semiconductor memory device 100 may be integrated into one semiconductor device to form a memory card. For example, the controller 200 and the semiconductor memory device 100 may be integrated into one semiconductor device to form a memory card such as a PC card (personal computer memory card international association (PCMCIA)), a compact flash (CF) card, a smart media card (SM or SMC), a memory stick, a multimedia card (MMC, RS-MMC, or MMCmicro), a secure digital (SD) card (SD, miniSD, microSD, or SDHC), and a universal flash storage (UFS).

The controller 200 and the semiconductor memory device 100 may be integrated into one semiconductor device to form a semiconductor drive (solid state drive (SSD)). The semiconductor drive (SSD) includes the memory system 1000 configured to store data in a semiconductor memory. When the memory system 1000 including the controller 200 and the semiconductor memory device 100 is used as the semiconductor drive (SSD), an operation speed of the host connected to the memory system 1000 is dramatically improved.

As another example, the memory system 1000 including the controller 200 and the semiconductor memory device 100 is provided as one of various components of an electronic device such as a computer, an ultra-mobile PC (UMPC), a workstation, a net-book, a personal digital assistants (PDA), a portable computer, a web tablet, a wireless phone, a mobile phone, a smart phone, an e-book, a portable multimedia player (PMP), a portable game machine, a navigation device, a black box, a digital camera, a 3-dimensional television, a digital audio recorder, a digital audio player, a digital picture recorder, a digital picture player, a digital video recorder, and a digital video player, a device capable of transmitting and receiving information in a wireless environment, one of various electronic devices configuring a home network, one of various electronic devices configuring a computer network, one of various electronic devices configuring a telematics network, an RFID device, or one of various components configuring a computing system.

In an embodiment, the semiconductor memory device 100 and the memory system 1000 including the same may be mounted as a package of various types. For example, the semiconductor memory device 100 or the memory system 1000 may be packaged and mounted in a method such as a package on package (PoP), ball grid arrays (BGAs), chip scale packages (CSPs), plastic leaded chip carriers (PLCC), a plastic dual in line package (PDIP), a die in waffle pack, die in wafer form, a chip on board (COB), a ceramic dual in line package (CERDIP), a plastic metric quad flat pack (MQFP), a thin quad flat pack (TQFP), a small outline integrated circuit package (SOIC), a shrink small outline package (SSOP), a thin small outline package (TSOP), a system in package (SIP), a multi-chip package (MCP), a wafer-level fabricated package (WFP), or a wafer-level processed stack package (WSP).

Figure 17:
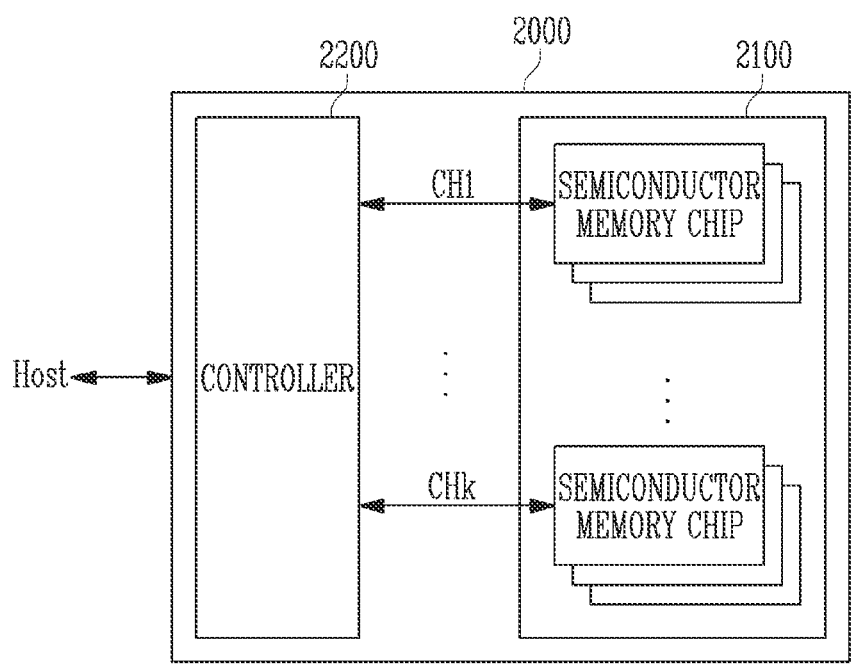
FIG. 17 is a block diagram illustrating an application example of the memory system of FIG. 1 according to an embodiment of the present disclosure.

FIG. 17 is a block diagram illustrating an application example of the memory system of FIG. 1 according to an embodiment of the present disclosure.

Referring to FIG. 17, the memory system 2000 includes a semiconductor memory device 2100 and a controller 2200. The semiconductor memory device 2100 includes a plurality of semiconductor memory chips. The plurality of semiconductor memory chips are divided into a plurality of groups.

In FIG. 17, the plurality of groups communicate with the controller 2200 through first to k-th channels CH1 to CHk, respectively. Each semiconductor memory chip is configured and is operated similarly to that of the semiconductor memory device 100 described with reference to FIG. 2.

Each group is configured to communicate with the controller 2200 through one common channel. The controller 2200 is configured similarly to the controller 200 described with reference to FIG. 16 and is configured to control the plurality of memory chips of the semiconductor memory device 2100 through the plurality of channels CH1 to CHk.

Figure 18:
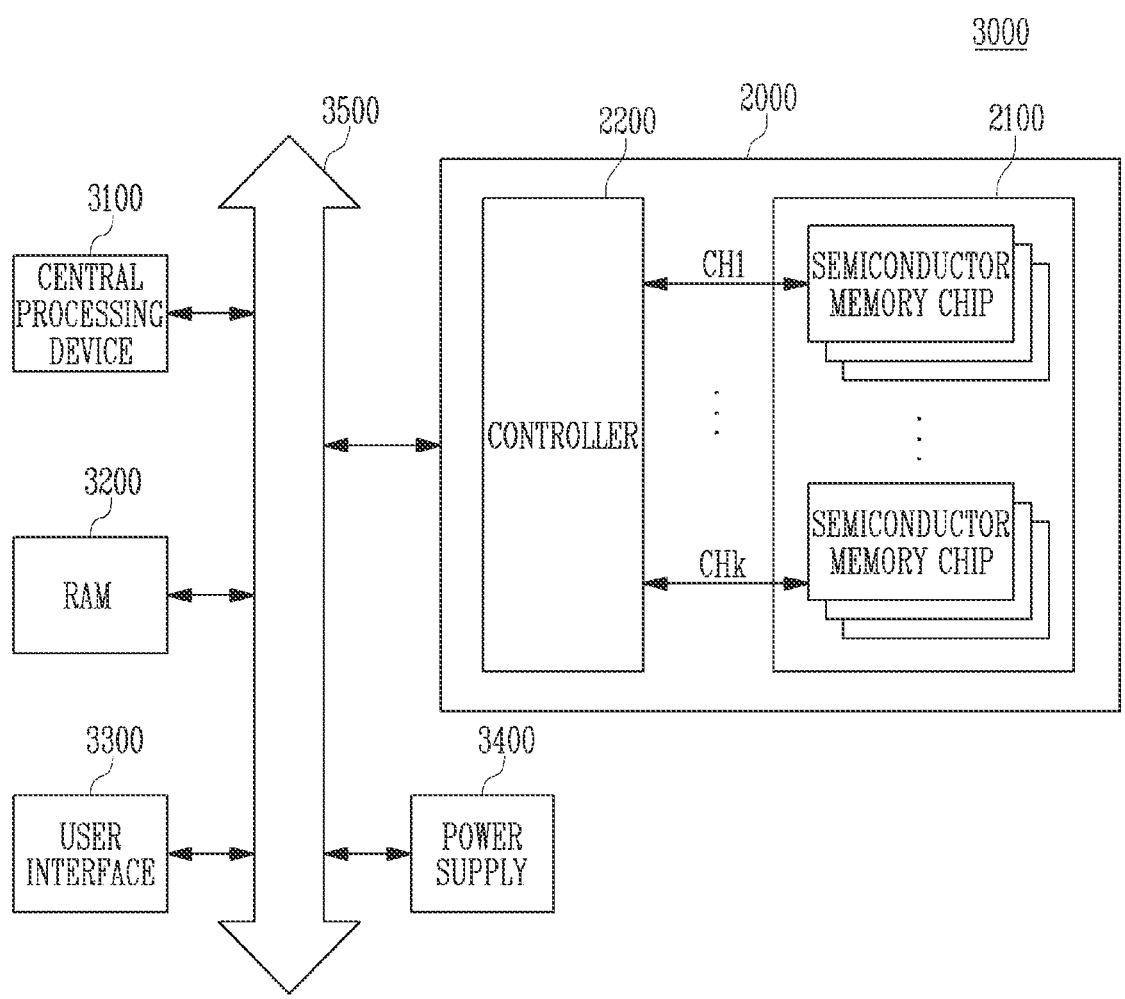
FIG. 18 is a block diagram illustrating a computing system including the memory system described with reference to FIG. 17 according to an embodiment of the present disclosure.

FIG. 18 is a block diagram illustrating a computing system including the memory system described with reference to FIG. 17 according to an embodiment of the present disclosure.

The computing system 3000 includes a central processing device 3100, a random access memory (RAM) 3200, a user interface 3300, a power supply 3400, a system bus 3500, and the memory system 2000.

The memory system 2000 is electrically connected to the central processing device 3100, the RAM 3200, the user interface 3300, and the power supply 3400 through the system bus 3500. Data provided through the user interface 3300 or processed by the central processing device 3100 is stored in the memory system 2000.

In FIG. 18, the semiconductor memory device 2100 is connected to the system bus 3500 through the controller 2200. However, the semiconductor memory device 2100 may be configured to be directly connected to the system bus 3500. At this time, a function of the controller 2200 is performed by the central processing device 3100 and the RAM 3200.

In FIG. 18, the memory system 2000 described with reference to FIG. 17 is provided. However, the memory system 2000 may be replaced with the memory system including the controller 200 and the semiconductor memory device 100 described with reference to FIG. 16.

The embodiments of the present disclosure disclosed in the present specification and drawings are merely specific examples for easily describing the technical content of the present disclosure and facilitating understanding of the present disclosure and should not limit the scope of the present disclosure. It is apparent to a person skilled in the art to which the present disclosure pertains that other modifications based on the technical spirit of the present disclosure may be carried out in addition to the embodiments disclosed herein and the following claims. Furthermore, the embodiments may be combined to form additional embodiments.

What is claimed is:

1. A controller that controls a semiconductor memory device including a plurality of memory blocks, the controller comprising:
   a block manager configured to manage information on the plurality of memory blocks;
   a map data manager configured to manage map data for data stored in the plurality of memory blocks; and
   a command generator configured to generate a program command for controlling a program operation of the semiconductor memory device,
   wherein the command generator generates the program command for the program operation of storing data in a first memory block among the plurality of memory blocks,
   wherein the command generator is further configured to determine a second memory block to store dummy data based on the information from the block manager when the first memory block is full by the program operation, and
   wherein the second memory block becomes a full state, as the dummy data is stored in the second memory block.

2. The controller of claim 1, wherein the command generator generates the program command for controlling the semiconductor memory device to store the dummy data in the second memory block.

3. The controller of claim 2, wherein the map data manager is further configured to update the map data corresponding to the first and second memory blocks and transmit the updated map data to the command generator.

4. The controller of claim 3, wherein the command generator generates the program command for controlling the semiconductor memory device to store the updated map data corresponding to the first and second memory blocks.

5. The controller of claim 1, wherein the command generator determines, as the second memory block, an open block in which an available space is smaller than a predetermined reference value among the plurality of memory blocks based on the information from the block manager.

6. The controller of claim 1, wherein the command generator determines, as the second memory block, an open block in which an available space is the smallest among the plurality of memory blocks based on the information from the block manager.

7. The controller of claim 1,
   wherein the plurality of memory blocks include a single-level cell (SLC) block, and at least one of a multi-level cell (MLC) block or a triple-level cell (TLC) block, wherein the first memory block is the at least one of the MLC block or the TLC block, and wherein the command generator determines the SLC block as the second memory block.

8. The controller of claim 1, wherein the plurality of memory blocks include a single-level cell (SLC) block, and at least one of a multi-level cell (MLC) block or a triple-level cell (TLC) block, wherein the first memory block is the SLC block, and wherein the command generator determines the at least one of the MLC block or the TLC block as the second memory block.

9. A method of operating a controller that controls a semiconductor memory device including a plurality of memory blocks, the method comprising:

controlling the semiconductor memory device to store data in a first memory block among the plurality of memory blocks; and determining a second memory block from among the plurality of memory blocks, in which dummy data is to be stored, in response to a determination that the first memory block is full, wherein the second memory block becomes a full state, as the dummy data is stored in the second memory block.

10. The method of claim 9, further comprising controlling the semiconductor memory device to store the dummy data in the second memory block.

11. The method of claim 9, further comprising:

updating map data corresponding to the first and second memory blocks; and controlling the semiconductor memory device to store the updated map data.

12. The method of claim 9, wherein the determining the second memory block comprises:

referring to an available space of each memory block corresponding to an open block among the plurality of memory blocks; and determining as the second memory block a memory block in which the available space is smaller than a predetermined reference value among the open blocks.

13. The method of claim 9, wherein the determining the second memory block comprises:

referring to an available space of each memory block corresponding to an open block among the plurality of memory blocks; and determining as the second memory block a memory block in which the available space is the smallest among the open blocks.

14. The method of claim 9, wherein the plurality of memory blocks include a single-level cell (SLC) block, and at least of a multi-level cell (MLC) block or a triple-level cell (TLC) block, wherein the first memory block is the at least one of the MLC block or the TLC block, and wherein the determining the second memory block includes determining the SLC block as the second memory block.

15. The method of claim 9, wherein the plurality of memory blocks include a single-level cell (SLC) block, and at least one of a multi-level cell (MLC) block or a triple-level cell (TLC) block, wherein the first memory block is the SLC block, and wherein the determining the second memory block includes determining the at least one of the MLC block or the TLC block as the second memory block.

16. An operating method of a controller for controlling a memory device including a plurality memory units, the operating method comprising:

controlling, when a first memory unit among the plurality of memory units becomes closed, the memory device to make a second memory unit among the plurality of memory units closed, by storing dummy data in the second memory unit;

updating map data corresponding to the first and second memory units; and controlling the memory device to store therein the updated map data.

17. The operating method of claim 16, wherein the second memory unit has an available storage space smaller than a threshold.

18. The operating method of claim 16, wherein the second memory unit has an available storage space smallest among open memory units included in the memory device.

* * * * *